US007199935B2

United States Patent
Inoguchi et al.

(10) Patent No.: US 7,199,935 B2
(45) Date of Patent: Apr. 3, 2007

(54) IMAGE DISPLAY APPARATUS AND IMAGE DISPLAY SYSTEM

(75) Inventors: Kazutaka Inoguchi, Tochigi (JP);
 Shoichi Yamazaki, Kanagawa (JP);
 Motomi Matsunaga, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 458 days.

(21) Appl. No.: 10/728,425

(22) Filed: Dec. 4, 2003

(65) Prior Publication Data
US 2004/0119664 A1 Jun. 24, 2004

(30) Foreign Application Priority Data
Dec. 4, 2002 (JP) ............................. 2002-352922

(51) Int. Cl.
 *G02B 27/14* (2006.01)

(52) U.S. Cl. ........................ 359/633; 359/631
(58) Field of Classification Search ................ 359/631, 359/633, 630; 345/8
 See application file for complete search history.

(56) References Cited

U.S. PATENT DOCUMENTS

| 4,322,135 | A |   | 3/1982  | Freeman ................ 350/410 |
|-----------|---|---|---------|---------------------------------|
| 5,035,474 | A | * | 7/1991  | Moss et al. ............... 359/13 |
| 5,334,991 | A | * | 8/1994  | Wells et al. ................ 345/8 |
| 5,392,158 | A | * | 2/1995  | Tosaki ..................... 359/633 |
| 5,909,325 | A | * | 6/1999  | Kuba et al. ............... 359/834 |
| 6,094,309 | A | * | 7/2000  | Ophey ..................... 359/630 |
| 6,501,602 | B2| * | 12/2002 | Togino et al. ............. 359/631 |
| 2002/0005998 | A1 |  | 1/2002 | Nagata et al. |
| 2002/0041446 | A1 | * | 4/2002 | Nagaoka ................. 359/630 |

FOREIGN PATENT DOCUMENTS

| EP | 1 186 933 | 3/2002 |
| GB | 2 316 758 | 3/1998 |
| JP | 9061748   | 8/1995 |
| JP | 7333551   | 12/1995 |
| JP | 850256    | 2/1996 |
| JP | 9247579   | 3/1996 |
| JP | 8160340   | 6/1996 |
| JP | 8179238   | 7/1996 |
| JP | 177785    | 6/2001 |
| JP | 194618    | 7/2001 |
| JP | 194619    | 7/2001 |

OTHER PUBLICATIONS

European Search Report dated Mar. 29, 2006 for EP Application No. 03257614.2.

* cited by examiner

*Primary Examiner*—Alicia M. Harrington
(74) *Attorney, Agent, or Firm*—Morgan & Finnegan, LLP

(57) ABSTRACT

An image display apparatus having a compact size and appropriately achieving a larger field angle is disclosed while it has two optical systems guiding light from a single image forming device to both eyes. The apparatus has the single image forming device forming an original image, and a first and a second optical system disposed on both sides of a central plane including a central axis of the image forming device. The optical systems guide light from the image forming device to a first and a second eye of an observer, respectively. When light traveling from the image forming device to each pupil of the optical systems is inversely traced from the pupil, each system includes a first surface reflecting the inversely traced light from the pupil in a direction away from the central plane, and a second surface reflecting the inversely traced light from the first surface in a direction away from the central plane.

5 Claims, 14 Drawing Sheets

IMAGE DISPLAY APPARATUS AND IMAGE DISPLAY SYSTEM

BACKGROUND OF THE INVENTION

1. Field of the Invention

The present invention relates to an image display apparatus such as a head mounted display which displays an original image formed in a single image forming device to an observer.

2. Description of Related Art

Image display apparatuses of a head mounted type (so-called head mounted displays) have conventionally been known in which an image forming device such as an LCD (Liquid Crystal Display) is used to enlargingly display an original image displayed in the image forming device through an optical system.

Since the head mounted display is mounted on the head of an observer, reductions in size and weight of the entire apparatus are particularly needed. The display preferably has a small thickness in the optic axis direction of the observer in consideration of weight balance, appearance and the like. In addition, it is desirable to display the largest possible enlarged image to produce a dynamic effect in the image.

For example, each of Japanese Patent Application Laid-Open No. H7 (1995)-333551, Japanese Patent Application Laid-Open No. H8 (1996)-50256, Japanese Patent Application Laid-Open No. H8 (1996)-160340, and Japanese Patent Application Laid-Open No. H8 (1996)-179238 has proposed a head mounted display which uses an LCD as an image forming device and a thin prism as an observation optical system to achieve a reduction in thickness of the entire apparatus.

FIG. 16 shows a head mounted display proposed in Japanese Patent Application Laid-Open No. H7 (1995)-333551. In the head mounted display, light emitted from an LCD 111 is incident on an incident surface 113 of a small decentered prism 112. The luminous flux is folded by a reflective surface 114 and a reflective surface 115 each having a curvature and formed on the prism 112, and then emerges from the surface 114 of the decentered prism 112 and is guided to an eye E of an observer. In this manner, a virtual image of an original image displayed in the LCD 111 is formed and observed by the observer.

The reflective surface 115 of the decentered prism 112 is formed of a decentered free-form surface made of a decentered rotationally asymmetric surface (a surface exhibiting different optical power depending on an azimuth angle, or a so-called free-form surface).

The optical system of the type shown in FIG. 16 is characterized by easily realizing a reduced thickness of the entire apparatus and a larger field angle of the visual field for observation as compared with a conventional type which uses a coaxial concave mirror and a half mirror inclined 45 degrees with respect to the optical axis of an eyeball.

In addition, it is desirable that the head mounted display is provided at a low price similarly to other image display apparatuses. As a solution therefor, U.S. Pat. No. 4,322,135 has disclosed a head mounted display of a single original image binocular observation type in which a single image forming device is used in combination with an optical system which guides a single original image formed in the image forming device to each of the left and right eyes of an observer.

FIG. 17 shows the structure of the head mounted display disclosed in U.S. Pat. No. 4,322,135. Image light emitted from a convex original image forming surface 202 of an object source 201 for displaying an original image such as an image intensifier is incident on an optical element 204 from its transmission area 205, reflected by portions 208 each having a reflective film formed thereon or internally reflected by transmission areas 207 of the optical element 204, reflected by concave mirror portions 203 each having a reflective film formed thereon, and then emerges from the transmissive areas 207. The light emerging from the optical element 204 passes through meniscus lenses 210 and is guided to both eyes E1 and E2 of an observer.

In addition, various head mounted displays have been proposed in recent years in which the head mounted display of the single original image binocular observation type is used in combination with a prism having a decentered free-form surface as described above. For example, Japanese Patent Application Laid-Open No. H9 (1997)-61748, Japanese Patent Application Laid-Open No. H9 (1997)-247579, Japanese Patent Application Laid-Open No. 2000-177785, Japanese Patent Application Laid-Open No. 2001-194618, and Japanese Patent Application Laid-Open No. 2001-194619 have proposed the structure of such displays.

The conventional head mounted displays described above, however, for example the displays proposed in Japanese Patent Application Laid-Open No. H9 (1997)-61748 and Japanese Patent Application Laid-Open No. H9 (1997)-247579, involve a high cost since different optical systems are used for both eyes.

In the other examples, the single optical system can be shared between both eyes. However, when the light from the image forming device to the pupil of image light is inversely traced from the pupil side, the inversely traced light is reflected by the first reflective surface inward toward the center laterally, so that it is difficult to realize a larger field angle.

The disadvantage is now described with reference to FIG. 18. Light emerging from an image forming device 311 is incident on an incident surface 313L of a small decentered prism 312L. The light is folded by a reflective surface 314L and a reflective surface 315L each having a curvature and formed on the prism 312L, and then emerges from the surface 314L of the decentered prism 312L and is guided to a left eye EL of an observer.

Similarly, light emerging from the image forming device 311 is incident on an incident surface 313R of a small decentered prism 312R. The light is folded by a reflective surface 314R and a reflective surface 315R each having a curvature and formed on the prism 312R, and then emerges from the surface 314R of the decentered prism 312R and is guided to a right eye ER of the observer.

In this manner, a virtual image of a single original image displayed in the image forming device (an LCD) 311 is observed by the left and right eyes EL and ER of the observer.

The following description is made with inversely traced light which is frequently used in optical design in the virtual image observation system. Rays from the eyes of the observer (rays from the pupil) are incident on the prisms 312L and 312R from the surfaces 314L and 314R. The rays are folded by the reflective surfaces 315L and 315R serving as the first decentered reflective surfaces in this case to approach the normal to the image forming device 311 displaced substantially at the center of both eyes. Thus, in the optical system described above, reflective areas shown by EA1L and EA1R are necessary in the surfaces 314L and 314R of the prisms 312L and 312R. These reflective areas EA1L and EA1R become larger as the field angle is larger.

The distance between the left and right eyes EL and ER (interpupillary distance) of an observer, however, is determined to some extent, so that it is impossible to extremely increase an interpupillary distance IPD between the pupils of the optical systems for left and right eyes. Consequently, a significant increase in field angle cannot be expected in this structure in which the inversely traced light is folded by the first reflective surface inward toward the center laterally.

SUMMARY OF THE INVENTION

It is an object of the present invention to provide an image display apparatus which involves a reduced cost, has a compact size, and appropriately achieves a larger field angle while it has two optical systems for guiding light from a single image forming device to both eyes.

To achieve the aforementioned object, according to one aspect of the present invention, an image display apparatus comprises a single image forming device which forms an original image, and a first optical system and a second optical system which are placed on both sides of a central plane which includes a central axis of the image forming device, the first optical system guiding light from the image forming device to a first eye of an observer placed near a pupil of the first optical system, and the second optical system guiding light from the image forming device to a second eye of the observer placed near a pupil of the second optical system, wherein, when light traveling from the image forming device to each of the pupils is inversely traced from the pupil, each of the first and second optical systems includes a first surface which reflects the inversely traced light from the pupil in a direction away from the central plane, and a second surface which reflects the inversely traced light from the first surface in a direction away from the central plane.

According to another aspect of the present invention, an image display apparatus comprises a single image forming device which forms an original image, and a first optical system and a second optical system, the first optical system guiding light from the image forming device to a first eye of an observer, and the second optical system guiding light from the image forming device to a second eye of the observer, wherein each of the first and second optical systems includes a first surface which reflects light from the image forming device, and a second surface which reflects the light from the first surface back to the first surface, and wherein the first surface again reflects the light from the second surface.

These and other characteristics of the image display apparatus and image display system using the same according to the present invention will be apparent from the following description of specific embodiments with reference to the drawings.

DETAILED DESCRIPTION OF THE PREFERRED EMBODIMENTS (Embodiment 1)

Figure 1:
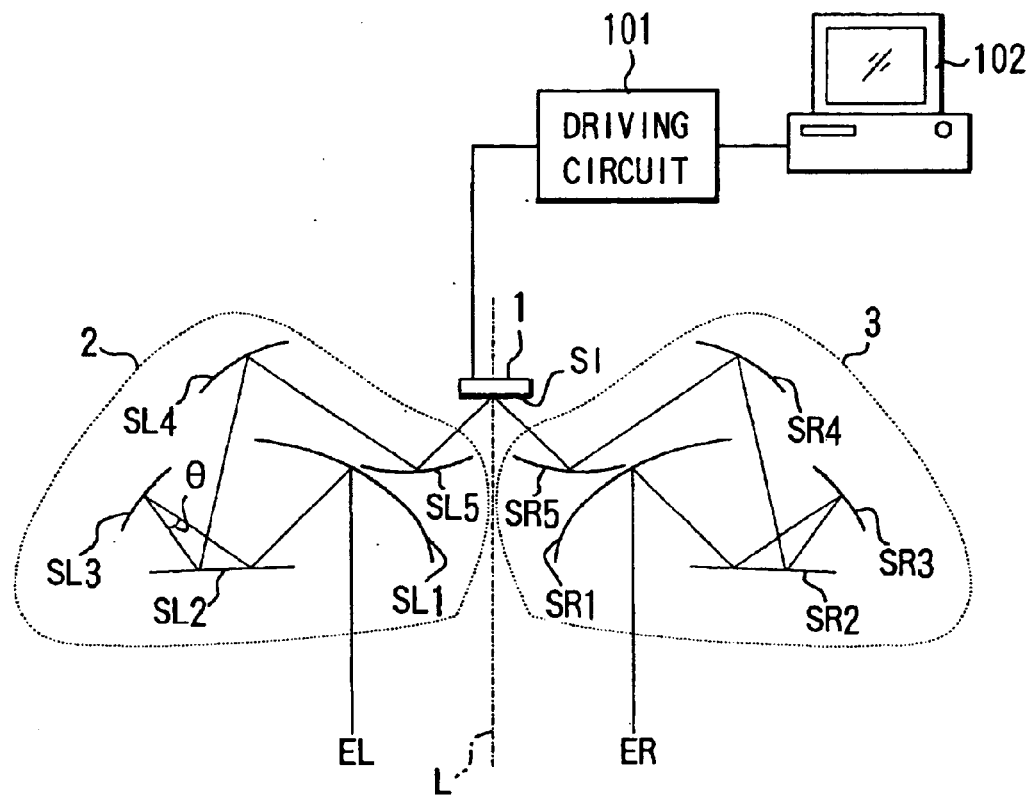
FIG. 1 shows the structure of main portions of a head mounted display which is Embodiment 1 of the present invention (showing a central principal ray)

FIG. 1 shows the structure of main portions of a head mounted display serving as an image display apparatus which is Embodiment 1 of the present invention. In FIG. 1, reference numeral 1 shows a single image forming device which forms an original image and is realized by a CRT, an LCD, an electroluminescence device or the like.

A driving circuit 101 is connected to the image forming device 1. The driving circuit 101 is supplied with image information from an image information supply apparatus such as a personal computer, a television, a VCR, a DVD player, a reception antenna and a tuner, and drives the image forming device 1 to display an original image corresponding to the image information. The image information supply apparatus and the head mounted display constitute an image display system. This applies to Embodiments 2 and 3, although not shown.

EL shows a left eye (a pupil position) of an observer located at a desirable position, and ER shows a right eye (a pupil position) of the observer located at a desirable position.

Reference numeral 2 shows a left eye optical system (a first optical system). The left eye optical system 2 has five reflective surfaces from a surface SL1 to a surface SL5 which are disposed to guide light from an image forming surface SI in the image forming device 1 to the left eye EL.

Reference numeral 3 shows a right eye optical system (a second optical system). The right eye optical system 3 has five reflective surfaces from a surface SR1 to a surface SR5 which are disposed to guide light from the image forming surface SI in the image forming device 1 to the right eye ER.

The left eye optical system 2 and the right eye optical system 3 of Embodiment 1 are disposed in mirror symmetry laterally with respect to a central plane perpendicular to the sheet of FIG. 1 and including a central axis L (shown by a dash dotted line in FIG. 1) which is the normal to the original image forming surface (which means an effective original image forming area, and this applies to the following description) SI of the image forming device 1 passing through the center thereof. It should be noted that the left and right eye optical systems 2 and 3 and the image forming device 1 may not be necessarily placed on the same plane.

Figure 2:
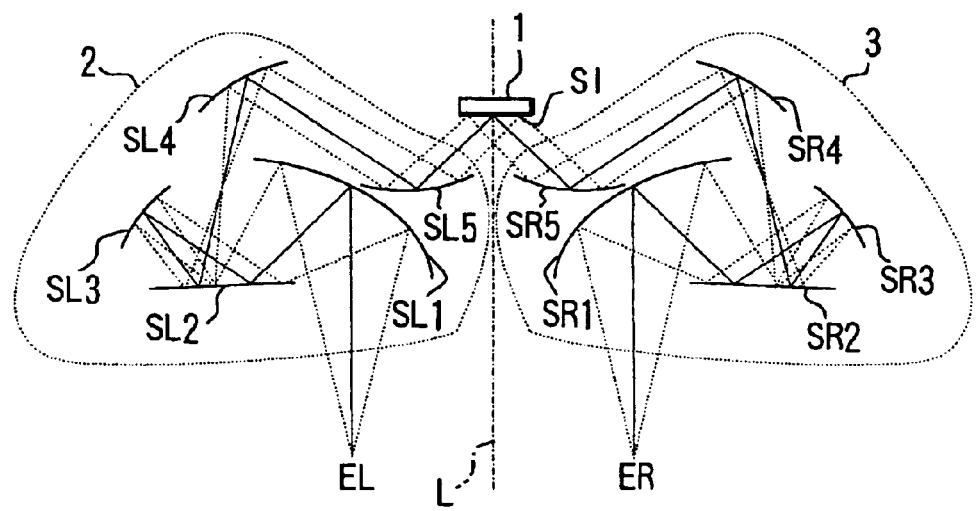
FIG. 2 shows the structure of main portions of the head mounted display which is Embodiment 1 (showing principal rays at the maximum field angle)
Figure 3:
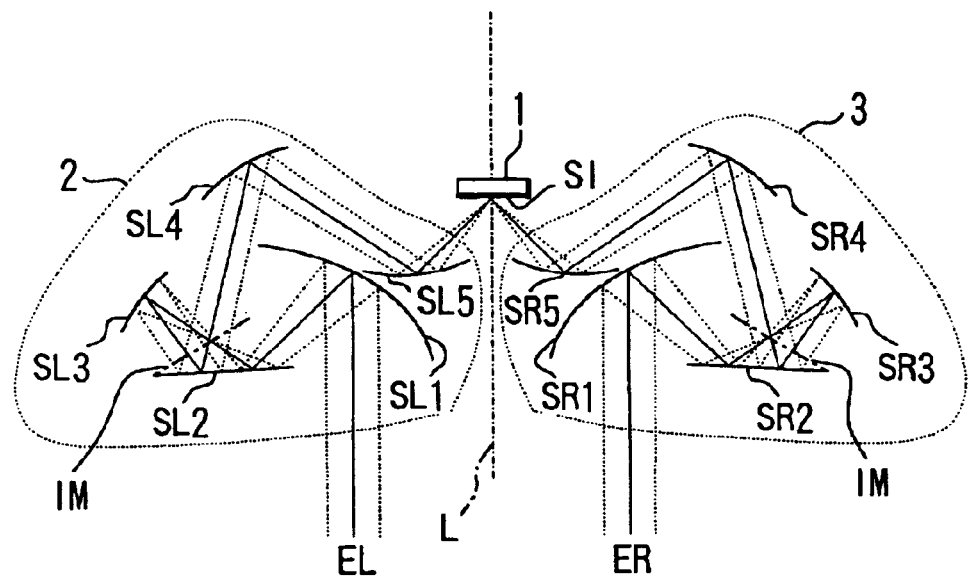
FIG. 3 shows the structure of main portions of the head mounted display which is Embodiment 1 (showing marginal rays)

FIG. 2 shows principal rays at the maximum field angle in a horizontal plane (in the sheet of FIG. 2) in Embodiment 1. FIG. 3 shows marginal rays which provide the effective pupil diameter for the center of the field angle in Embodiment 1.

In FIG. 2, rays emerging from both of the left and right ends in the original image forming surface SI of the image forming device 1 (shown by dotted lines in FIG. 2) are converged to EL and ER which are desirable pupil positions of the observer to form the exit pupils of the left eye optical system 2 and the right eye optical system 3.

In FIG. 3, rays emerging from the center of the original image forming surface SI of the image forming device 1 (shown by solid lines and dotted lines in FIG. 3) are changed into substantially collimated rays by the left eye optical system 2 and the right eye optical system 3 and recognized by the observer as light from a pixel substantially at infinity or at a predetermined distance.

Next, optical effects in Embodiment 1 are described with reference to FIGS. 1 to 3. The rays shown by the solid lines in FIGS. 1 to 3 show central principal rays (also referred to as central field angle principal rays) which emerge from the center of the original image forming surface SI of the image forming device 1 to the centers of the exit pupils of the left eye and right eye optical systems 2 and 3. Each reflective surface constituting the optical system of this embodiment is a reflective surface which is decentered with respect to the central field angle principal ray.

The light emerging from the center of the original image forming surface SI of the image forming device 1 toward the left eye optical system 2 is reflected by the surface SL5 and the surface SL4, and then guided to the surface SL2. The light reflected by the surface SL2 is reflected by the surface SL3 back to the surface SL2. The light again reflected by the surface SL2 is reflected by the surface SL1 and guided to the left eye EL of the observer.

Similarly, the light emerging from the center of the original image forming surface SI of the image forming device 1 toward the right eye optical system 3 is reflected by the surface SR5 and the surface SR4, and then guided to the surface SR2. The light reflected by the surface SR2 is reflected by the surface SR3 back to the surface SR2. The light again reflected by the surface SR2 is reflected by the surface SR1 and guided to the right eye ER of the observer.

In this event, in the left eye optical system 2, the light reflected by the surface SL4 travels in a direction toward the left and away from the central axis L between the optical systems 2 and 3 shown by the dash dotted line in FIGS. 1 to 3 and is incident on the surface SL2, and further reflected thereby in a direction toward the left and away from the central axis L. The light is reflected by the surface SL3 back to the surface SL2 in the opposite direction, that is, in a direction approaching the central axis L. The light is then reflected again by the surface SL2 and travels in a direction approaching the central axis L.

In this manner, the surface SL2 is used as a surface by which the light is reflected twice, and the surface SL3 is provided to serve as a returning reflective surface for reflecting the light back in the opposite direction between the two reflections. Thus, a go and return optical path is formed such that the light travels from the surfaces SL2, SL3, and then to SL2. This reduces the size of the optical system by the overlapping optical paths in the optical system. Particularly, the returning reflective surface SL3 reflects the light such that the traveling directions of the light after the two respective reflections by the surface SL2 are opposite to each other laterally to make the optical system compact.

The light reflected by the surface SL3 in the direction approaching the central axis L and further reflected by the surface SL2 in the direction approaching the central axis L is reflected by the surface SL1 toward the left eye EL of the observer. In other words, when the rays traveling from the image forming device 1 toward the pupil are inversely traced from the pupil, the inversely traced rays are bent by the surface SL1 in an outward direction away from the central axis L (that is, the central plane), and further bent by the surface SL2 in the outward direction away from the central axis L. This can reduce the number of optical elements disposed between the rays toward the left eye EL and the central axis L, and advantage can be taken of that reduction to increase the field angle, thereby making it possible to employ an optical arrangement suitable for a larger field angle.

The left eye optical system 2 has the structure in which a plurality of decentered reflective surfaces are used to fold the optical path. This can be combined with the go and return optical path provided as described above to confine a large optical path length within the small optical system.

It is thus possible to use the structure of one-time image formation in which an intermediate image of the original image formed on the original image forming surface SI of the image forming device 1 is once formed in the left eye optical system 2 and the intermediate image is enlarged and presented as a virtual image.

In Embodiment 1, for example as shown in FIG. 3, the intermediate image (a real image) is formed on an intermediate image forming surface IM after the reflection by the surface SL3 and before the re-reflection by the surface SL2. The surfaces SL5, SL4, SL2, and SL3 are used as a relay optical system, while the surfaces SL2 and SL1 are used as an ocular optical system. This can increase the flexibility in field angle setting for the size of the original image forming surface SI of the image forming device 1 to achieve a larger field angle.

In this event, to reduce the number of the optical elements in the relay optical system and the ocular optical system, the intermediate image may be curved as appropriate to have an astigmatic difference such that aberration caused by the relay optical system and aberration caused by the ocular optical system cancel out each other. This structure can prevent an increase in the number of the optical elements while optical performance of the entire system is maintained.

In Embodiment 1, at least two of the decentered reflective surfaces SL1, SL2, SL3, SL4, and SL5 constituting the left eye optical system 2 are formed as curved surfaces to enlargingly present an image of the original image formed on the original image forming surface SI of the image forming device 1. If the number of curved reflective surfaces is increased among the decentered reflective surfaces, it is possible to reduce the number of optical elements which do not contribute to image formation or aberration correction. As a result, a cost reduction and improvement in optical performance can be achieved.

More desirably, all the decentered reflective surfaces may be formed as curved surfaces to further reduce the cost and improve optical performance.

The surface SL3 reflects the central principal ray back substantially in the opposite direction to provide the aforementioned go and return optical path. The surface SL3 is preferably formed to satisfy the following expression:

$$\theta < 45°$$

where $\theta$ represents an angle (in the absolute value) formed between the central principal ray as the incident ray on the surface SL3 after the reflection by the surface SL2 and the central principal ray as the emerging (reflected) ray traveling toward the surface SL2 after the reflection by the surface SL3 as shown in FIG. 1.

If the angle $\theta$ is equal to or larger than 45°, it is difficult for the surface SL3 to function as the returning reflective surface and thus to form the go and return optical path. Consequently, the size of the optical system is extremely increased.

More desirably, the following is satisfied:

$$\theta < 30°$$

If the angle $\theta$ is equal to or larger than 30°, the surface SL2 has a large effective surface size to cause difficulty in making the entire optical system compact, although the surface SL3 can have the function as the returning reflective surface.

When the decentered reflective surface is formed as a curved surface, rotationally asymmetric aberration or so-called decentering aberration occurs which is not caused in a conventional coaxial and rotationally symmetric optical system. It is thus preferable that at least one of the decentered reflective surfaces is formed as a rotationally asymmetric shape to correct the decentering aberration. Since an increased number of rotationally asymmetric surfaces enhances the flexibility in correction of the decentering aberration, a plurality of surfaces are desirably formed as rotationally asymmetric surfaces.

More desirably, all the decentered reflective curved surfaces may be formed in a rotationally asymmetric shape to achieve significantly favorable optical performance.

The above description for the structure and the optical effects of the left eye optical system 2 applies to the right eye optical system 3. Thus, the head mounted display as a whole can have an optical structure which involves a reduced cost, has a compact size, and appropriately achieves a larger field angle while guiding an image of the original image formed in the single image forming device 1 to the left and right eyes.

It is desirable that the aforementioned rotationally asymmetric surface is plane-symmetric longitudinally (in a direction perpendicular to the sheet of the figures) with respect to a horizontal plane (the sheet) passing through the center of the original image forming surface SI of the image forming device 1 and the center between the exit pupils of the left and right eye optical systems 2 and 3 (in other words, the central axis L). Since the structure described above can provide a reference plane for manufacturing and assembly, the manufacturing and assembly are facilitated to produce the effect of a cost reduction. In addition, with such a surface shape, the left eye optical system 2 and the right eye optical system 3 have the same elements disposed at positions rotated 180 degrees about the central axis L. The left eye optical system 2 and the right eye optical system 3 can be realized with the same elements, so that the effect of a manufacturing cost reduction can be produced.

(Embodiment 2)

Figure 4:
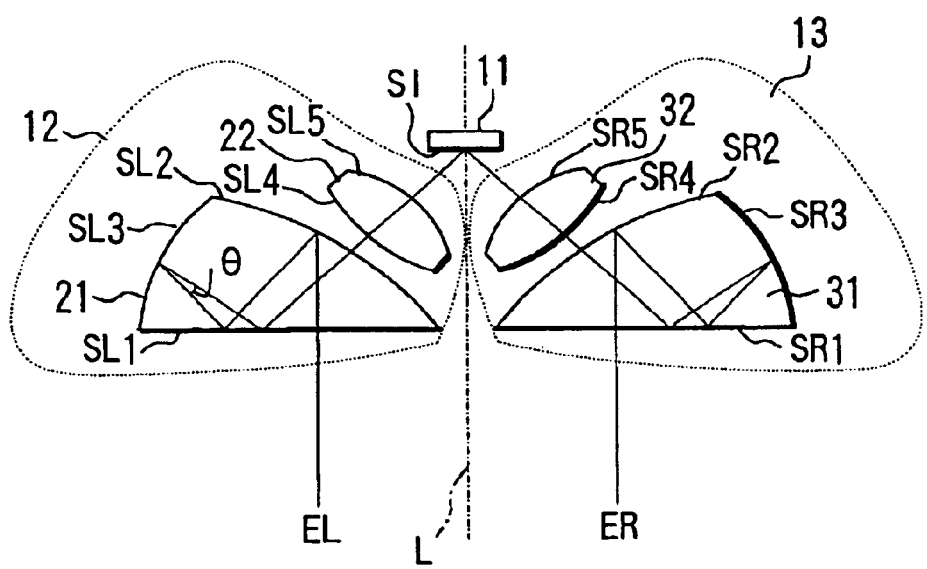
FIG. 4 shows the structure of main portions of a head mounted display which is Embodiment 2 of the present invention (showing a central principal ray)

FIG. 4 shows the structure of main portions of a head mounted display which is Embodiment 2 of the present invention.

In FIG. 4, reference numeral 11 shows a single image forming device which forms an original image. EL shows a left eye (a pupil position) of an observer located at a desirable position, and ER shows a right eye (a pupil position) of the observer located at a desirable position.

Reference numeral 12 shows a left eye optical system (a first optical system). The left eye optical system 12 has a prism 21 which has three surfaces of a surface SL1, a surface SL2 having a semi-transmissive reflective film formed thereon, and a surface SL3 having a reflective film formed thereon. The optical system also has a lens 22 which has transmissive surfaces SL4 and SL5. These are arranged to guide light from an original image forming surface SI of the image forming device 11 to the left eye EL.

Reference numeral 13 shows a right eye optical system. The right eye optical system 13 has a prism 31 which has three surfaces of a surface SRI, a surface SR2 having a semi-transmissive reflective film formed thereon, and a surface SR3 having a reflective film formed thereon. The optical system 13 also has a lens 32 which has transmissive surfaces SR4 and SR5. These are arranged to guide light from the original image forming surface SI of the image forming device 11 to the right eye ER.

The left eye optical system 12 and the right eye optical system 13 of Embodiment 2 are disposed in mirror symmetry laterally with respect to a central plane perpendicular to the sheet of FIG. 4 and including a central axis L (shown by a dash dotted line in FIG. 4) which is the normal to the original image forming surface SI of the image forming device 11 passing through the center thereof.

Such a structure can realize the left eye optical system 12 and the right eye optical system 13 with the same elements, so that the effect of a manufacturing cost reduction can be provided.

Figure 5:
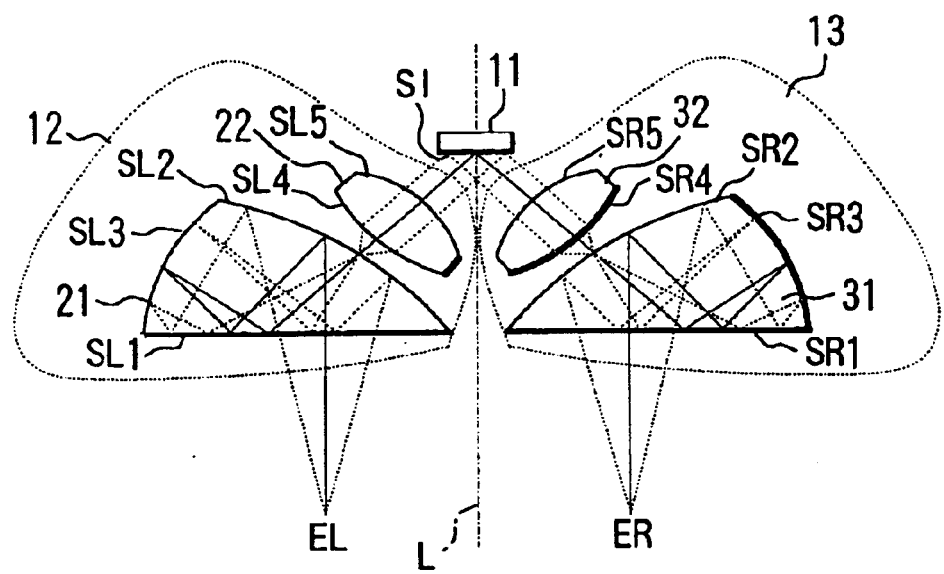
FIG. 5 shows the structure of main portions of the head mounted display which is Embodiment 2 (showing principal rays at the maximum field angle)
Figure 6:
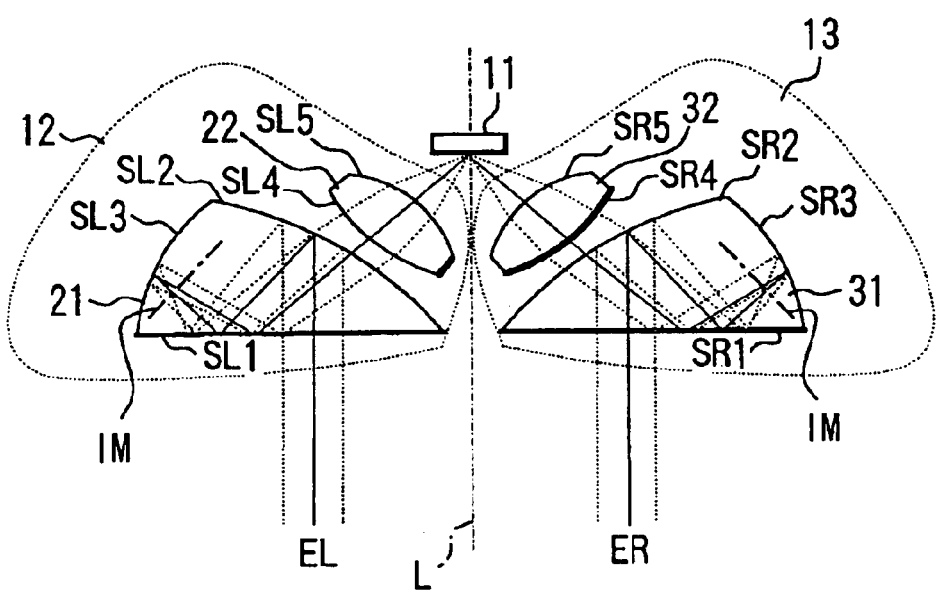
FIG. 6 shows the structure of main portions of the head mounted display which is Embodiment 2 (showing marginal rays)

FIG. 5 shows principal rays at the maximum field angle in a horizontal plane (in the sheet) in Embodiment 2. FIG. 6 shows marginal rays which provide the effective pupil diameter for the center of the field angle in Embodiment 2.

In FIG. 5, rays emerging from both of the left and right ends in the original image forming surface SI of the image forming device 11 are converged to EL and EL which are desirable pupil positions of the observer to form exit pupils of the left eye optical system 12 and the right eye optical system 13.

In FIG. 6, rays emerging from the center of the original image forming surface SI of the image forming device 11 (shown by solid lines and dotted lines in FIG. 6) are changed into substantially collimated rays by the left eye optical system 12 and the right eye optical system 13 and recognized by the observer as light from a pixel substantially at infinity or at a predetermined longer distance as compared with the distance from the exit pupil position to the original image forming surface SI.

Next, optical effects in Embodiment 2 are described with reference to FIGS. 4 to 6. The rays shown by solid lines in FIGS. 4 to 6 show central principal rays which emerge from the center of the original image forming surface SI of the image forming device 11 to the centers of the pupils of the left eye and right eye optical systems 12 and 13.

The light emerging from the center of the original image forming surface SI of the image forming device 11 toward the left eye optical system 12 is refracted and transmitted by the surface SL5 and the surface SL4 of the lens 22, and then guided to the surface SL2 of the prism 21. The light refracted and transmitted by the surface SL2 and entering the prism 21 is reflected by the surface SL1 and then reflected by the surface SL3 back to the surface SL1.

The light reflected again by the surface SL1 is reflected by the surface SL2 and then travels again toward the surface SL1. The light toward the surface SL1 is now transmitted by the surface SL1 and guided to the left eye EL of the observer.

Similarly, the light emerging from the center of the original image forming surface SI of the image forming device 11 toward the right eye optical system 13 is refracted and transmitted by the surface SR5 and the surface SR4 of the lens 32, and then guided to the surface SR2 of the prism 31. The light refracted and transmitted by the surface SR2 and entering the prism 31 is reflected by the surface SR1 and then reflected by the surface SR3 back to the surface SR1.

The light reflected again by the surface SR1 is reflected by the surface SR2 and then travels again toward the surface SR1. The light toward the surface SR1 is now transmitted by the surface SR1 and guided to the right eye ER of the observer.

The reflection and re-reflection by the surfaces SL1 and SR1 are realized by semi-transmissive reflective films (half mirrors) formed on the surfaces SL1 and SR1 or by internal total reflection (the total reflection is occurred by incidence of rays at a larger incident angle than a critical angle) in the prisms 21 and 31. The use of the internal total reflection is preferable since the light use efficiency can be increased to display a bright image.

It is also possible that no reflective film is provided but internal total reflection is used in each area of the surfaces SL1 and SR1 through which effective rays pass and a reflective film is formed to reflect rays in the other portions. In this case, the flexibility of optical design can be increased without significantly reducing brightness to improve the optical performance and reduce the size of the optical system as compared with the case where all the rays are subjected to internal total reflection.

When the reflective film is formed on part of each of the surfaces SL1 and SR1 in this manner to provide both of the reflective area using the reflective film and the reflective area using the internal total reflection in the single surface, a gradation reflective film is desirably used to have a gradually increasing thickness toward the reflective area using the reflective film from the reflective area using the internal total reflection (in a direction away from the central axis L shown by the dash dotted line in this case) near the boundary between the areas. This is preferable since the boundary between the reflective area using the reflective film and the reflective area using the internal total reflection is not conspicuous.

In Embodiment 2, the surfaces SL1 and SR1 are used to produce both the decentering reflection effect twice and the transmission effect to reduce the number of necessary optical elements. In addition, the surface SL2 and SR2 are used to produce both the transmission effect and the decentering reflection effect to further reduce the number of optical elements.

In the left eye optical system 12, the light incident on the prism 21 from the surface SL2 travels in a direction (to the left) away from the central axis L between the left and right eye optical systems 12 and 13 shown by the dash dotted line in FIGS. 4 to 6, and is incident on the surface SL1. The light is further reflected in a direction away from the central axis L and incident on the surface SL3. Then, the light is reflected by the surface SL3 back to the surface SL1 in the opposite direction, that is, in a direction approaching the central axis L, and is reflected again by the surface SL1 and travels in a direction approaching the central axis L.

In this manner, the surface SL1 is used as a surface by which the light is reflected twice, and the surface SL3 is provided to serve as a returning reflective surface for reflecting the light back in the opposite direction between the two reflections. Thus, a go and return optical path is formed such that the light travels from the surfaces SL1, SL3, and then to SL1. This reduces the size of the optical system by the overlapping optical paths in the optical system. Particularly, the returning reflective surface SL3 reflects the light such that the traveling directions of the light in the two reflections by the surface SL1 are opposite to each other laterally to make the optical system compact.

In Embodiment 2, by adding the surface SL2 which allows the light to enter the prism 21 and serves as the final reflective concave mirror in the prism 21, a go and return optical path is formed such that the light travels from the surfaces SL2, SL1, SL3, SL1, and then to SL2 to provide the overlapping optical paths. This increases the overlap of the light to extremely reduce the size of the optical system for the optical path length.

In Embodiment 2, the light reflected by the surface SL1 in the direction approaching the central axis L is guided by the surface SL2 toward the left eye EL of the observer. In other words, when the rays traveling from the image forming device 11 toward the pupil are inversely traced from the pupil, the inversely traced rays are bent by the surface SL2 in an outward direction away from the central axis L (that is, the central plane), and further bent by the surface SL1 in the outward direction away from the central axis L. This can reduce the size of the area which is optically used between the rays toward the left eye EL and the central axis L for the field angle, and advantage can be taken of that reduction to increase the field angle, thereby making it possible to employ an optical arrangement suitable for a larger field angle.

Embodiment 2 employs the structure in which a plurality of decentered reflective surfaces SL1 and SL2 are used to fold the optical path to achieve a reduced thickness. The structure can be combined with the go and return optical path provided as described above to ensure a large optical path length in the small and thin optical system. It is thus possible to employ the structure of one-time image formation in which an intermediate image of the original image formed in the original image forming surface SI of the image forming device 11 is once formed in the left eye optical system 12 and the intermediate image is enlarged and presented as a virtual image while the optical system is formed in a compact size.

In Embodiment 2, for example as shown in FIG. 6, the intermediate image (a real image) is formed on an intermediate image forming position IM after the reflection by the surface SL3 and before the re-reflection by the surface SL1. The surfaces SL5, SL4, SL2, SL1, and SL3 are used as a relay optical system, while the surfaces SL1, SL2, and SL1 are used as an ocular optical system. This can increase the flexibility in field angle setting for the size of the original image forming surface SI of the image forming device 11 to achieve a larger field angle.

In this event, to reduce the number of the optical elements in the relay optical system and the ocular optical system, the intermediate image may be curved as appropriate to have an astigmatic difference such that aberration caused by the relay optical system and aberration caused by the ocular optical system cancel out each other. This structure can prevent an increase in the number of the optical elements while optical performance of the entire system is maintained.

In the structure of Embodiment 2, at least one of the two decentered reflective surfaces SL1 and SL2 constituting part of the left eye optical system 12 is formed as a curved surface to enlargingly present the original image formed in the original image forming surface SI of the image forming device 11. If the number of curved reflective surface is increased among the decentered reflective surfaces, it is possible to reduce the number of optical elements which do not contribute to image formation or aberration correction. As a result, a cost reduction and improvement in optical performance can be achieved. That is, both of the two decentered reflective surfaces may be formed as curved surfaces to allow a cost reduction and improvement in optical performance.

Since the SL3 is disposed at an angle to reflect the central principal ray substantially perpendicularly in order to provide the aforementioned go and return optical path, the surface SL3 is not necessarily decentered with respect to the central principal ray.

The surface SL3 is preferably formed to satisfy the following expression:

$$\theta < 45°$$

where θ represents an angle (in the absolute value) formed between the central principal ray as the incident ray on the surface SL3 after the reflection by the surface SL1 and the central principal ray as the emerging (reflected) ray traveling toward the surface SL1 after the reflection by the surface SL3 as shown in FIG. 4.

If the angle θ is equal to or larger than 45°, it is difficult for the surface SL3 to function as the returning reflective surface and thus to form the go and return optical path. Consequently, the optical system structure of Embodiment 2 is not possible.

More desirably, the following is satisfied:

$$\theta < 30°$$

If the angle θ is equal to or larger than 30°, the surface SL1 has a large effective surface size to cause difficulty in making the entire optical system compact, although the surface SL3 can have the function as the returning reflective surface.

Thus, it is desirable that the surface SL3 is not decentered with respect to the central principal ray (θ=0°) or is a decentered reflective surface in the aforementioned range of the condition for θ. Similarly to the aforementioned decentered reflective surface, when the surface SL3 serving as the returning reflective surface is formed as a curved surface, the number of optical elements which do not contribute to image formation or aberration correction can be reduced to achieve a cost reduction and improvement in optical performance.

When the decentered reflective surface is formed as a curved surface, rotationally asymmetric aberration or so-called decentering aberration occurs which is not caused in a conventional coaxial and rotationally symmetric optical system. Thus, it is preferable that at least one of the decentered reflective surfaces is formed in a rotationally asymmetric shape to correct the decentering aberration.

Since an increased number of rotationally asymmetric surfaces enhances the flexibility in correction of the decentering aberration, a plurality of surfaces are desirably formed as rotationally asymmetric surfaces. More desirably, all the decentered reflective curved surfaces may be formed in a rotationally asymmetric shape to achieve significantly favorable optical performance. When the surface SL3 is formed in a rotationally asymmetric shape, the flexibility in correction of the decentering aberration can be more increased to realize favorable optical performance.

The above description for the structure and the optical effects of the left eye optical system 12 applies to the right eye optical system 13. Thus, the head mounted display as a whole has an optical structure which involves a reduced cost, has a compact size, and appropriately achieves a larger field angle while guiding an image of the original image formed in the single image forming device 11 to the left and right eyes.

It is desirable that the aforementioned rotationally asymmetric surfaces are plane-symmetric longitudinally (in a direction perpendicular to the sheet of the figures) with respect to a horizontal plane (the sheet) passing through the center of the original image forming surface SI of the image forming device 11 and the center between the exit pupils of the left and right eye optical systems 12 and 13 (in other words, the central axis L). Since the structure described above can provide a reference plane for manufacturing and assembly, the manufacturing and assembly are facilitated to provide the effect of a cost reduction. Particularly, when the horizontal plane is the only symmetry plane, the flexibility in optical design can be increased to achieve favorable optical performance while the reference plane for manufacturing and assembly is maintained. In addition, with such a surface shape, the left eye optical system 12 and the right eye optical system 13 have the same elements arranged at the positions rotated 180 degrees about the central axis L. The left eye optical system 12 and the right eye optical system 13 can be achieved with the common parts, so that the effect of a manufacturing cost reduction can be provided.

Embodiment 3

Figure 7:
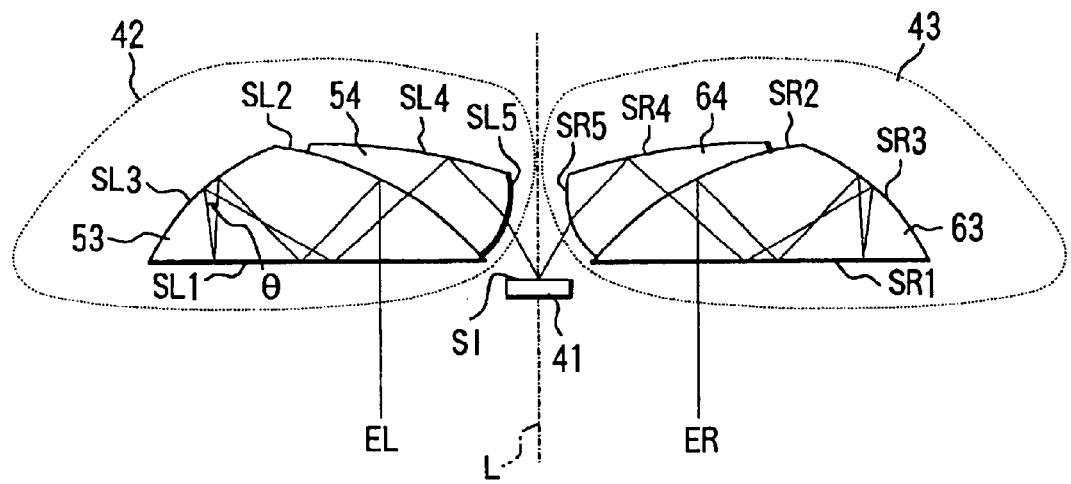
FIG. 7 shows the structure of main portions of a head mounted display which is Embodiment 3 of the present invention (showing a central principal ray)

FIG. 7 shows the structure of main portions of a head mounted display which is Embodiment 3 of the present invention. In FIG. 7, reference numeral 41 shows a single image forming device which forms an original image. EL shows a left eye (a pupil position) of an observer located at a desirable position, and ER shows a right eye (a pupil position) of the observer located at a desirable position.

Reference numeral 42 shows a left eye optical system(a first optical system). The left eye optical system 42 has a prism 53 which has three surfaces of a surface SL1 having a reflective film formed on at least a portion thereof, a surface SL2 having a semi-transmissive reflective film formed thereon, and a surface SL3 having a reflective film formed thereon. The optical system 42 also has a prism 54 which has the cemented surface SL2 t o the prism 53, a surface SL4 having a reflective film formed thereon, and a surface SL5 as a transmissive surface. These are arranged to guide light from an original image forming surface SI of the image forming device 41 to the left eye EL.

Reference numeral 43 shows a right eye optical system. The right eye optical system 43 has a prism 63 which has three surfaces of a surface SR1 having a reflective film formed on at least a portion thereof, a surface SR2 having a semi-transmissive reflective film formed thereon, and a surface SR3 having a reflective film formed thereon. The optical system 43 also has a prism 64 which has the cemented surface SR2 to the prism 63, a surface SL4 having a reflective film formed thereon, and a surface SL5 as a transmissive surface. These are arranged to guide light from the original image forming surface SI of the image forming device 41 to the right eye ER.

The left eye optical system 42 and the right eye optical system 43 of Embodiment 3 are disposed in mirror symmetry laterally with respect to a central plane perpendicular to the sheet of FIG. 7 and including a central axis L (shown by a dash dotted line in FIG. 7) which is the normal to the original image forming surface SI of the image forming device 41 passing through the center thereof.

Although details are later described, it is desirable in Embodiment 3 that respective optical surfaces constituting the left eye optical system 42 and the right eye optical system 43 are symmetrically shaped perpendicularly with respect to the sheet (a horizontal plane including the central axis L). Thus, the left eye optical system 42 and the right eye optical system 43 have the same elements arranged at the positions rotated 180 degrees about the central axis L (shown by the dash dotted line in FIG. 7).

This structure allows the left eye optical system 42 and the right eye optical system 43 to be realized with the same elements, so that the effect of a manufacturing cost reduction can be provided.

Figure 8:
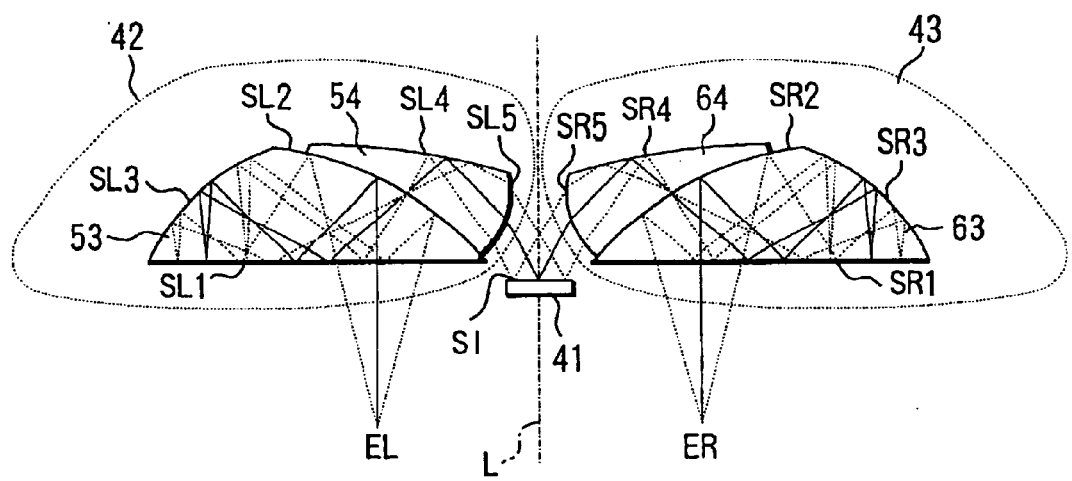
FIG. 8 shows the structure of main portions of the head mounted display which is Embodiment 3 (showing principal rays at the maximum field angle)
Figure 9:
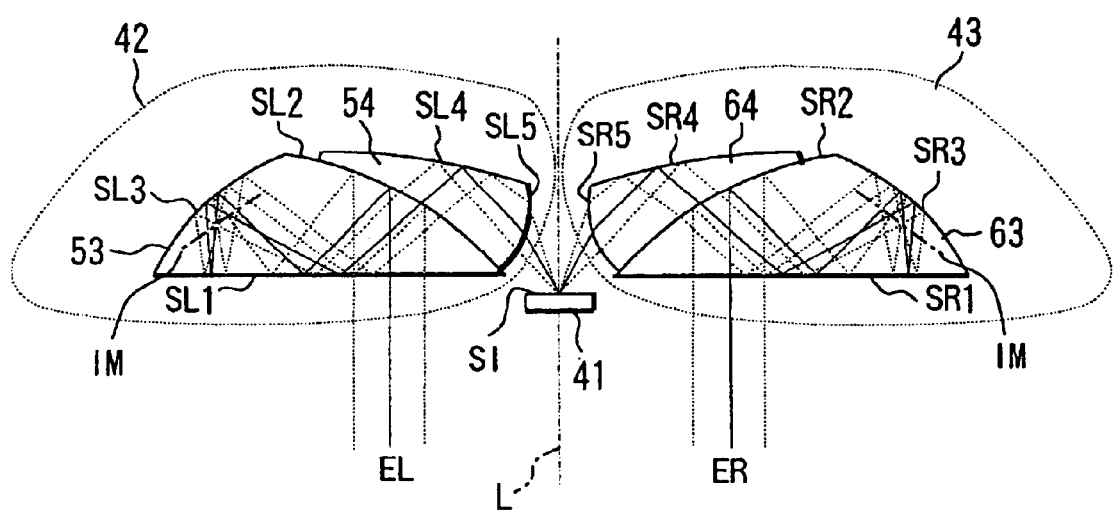
FIG. 9 shows the structure of main portions of the head mounted display which is Embodiment 3 (showing marginal rays)

FIG. 8 shows principal rays at the maximum field angle in a horizontal plane (in the sheet) in Embodiment 3. FIG. 9 shows marginal rays which form the effective pupil diameter for the center of the field angle in Embodiment 3.

In FIG. 8, rays emerging from both of the left and right ends of the original image forming surface SI (effective display area) of the image forming device 41 are converged to the left eye EL and the right eye EL which are desirable pupil positions of the observer to form the exit pupils of the left eye optical system 42 and the right eye optical system 43.

In FIG. 9, rays emerging from the center of the original image forming surface SI of the image forming device 41 are changed into substantially collimated rays by the left eye optical system 42 and the right eye optical system 43 and recognized by the observer as light from a pixel at infinity or at a predetermined longer distance as compared with the distance from the exit pupil position to the original image forming surface SI.

Next, optical effects in Embodiment 3 are described with reference to FIGS. 7 to 9. The rays shown by solid lines in FIGS. 7 to 9 show central principal rays which emerge from the center of the original image forming surface SI of the image forming device 41 to the centers of the pupils of the left eye and right eye optical systems 42 and 43.

The light emerging from the center of the original image forming surface SI of the image forming device 41 toward the left eye optical system 42 is refracted and transmitted by the surface SL5 and enters the prism 54, reflected by the surface SL4, and guided to the surface SL2. The surface SL2 is the cemented surface between the prism 54 and the prism 53, and is a half mirror surface having the semi-transmissive reflective film formed on at least one side thereof.

Part of the light guided to the surface SL2 is transmitted by the surface SL2 and enters the prism 53. The light entering the prism 53 is reflected by the surface SL1 and then by the surface SL3, again travels toward the surface SL1, and is reflected by the surface SL1 back to the surface SL3. The light again reflected by the surface SL3 travels toward the area of the surface SL1 where the light is first reflected, and is reflected by the surface SL1.

Part of the light reflected by the surface SL1 is reflected by the surface SL2 which is the half mirror surface, and then travels toward the surface SL1. The light is now transmitted by the surface SL1 and guided to the left eye EL of the observer.

Similarly, the light emerging from the center of the original image forming surface SI of the image forming device 41 toward the right eye optical system 43 is refracted and transmitted by the surface SR5 and enters the prism 64, reflected by the surface SR4, and guided to the surface SR2. The surface SR2 is the cemented surface between the prism 64 and the prism 63, and is a half mirror surface having the semi-transmissive reflective film formed on at least one side thereof.

Part of the light guided to the surface SR2 is transmitted by the surface SR2 and enters the prism 63. The light entering the prism 63 is reflected by the surface SR1 and then by the surface SR3, again travels toward the surface SR1, and is reflected by the surface SR1 back to the surface SR3. The light again reflected by the surface SR3 travels toward the area of the surface SR1 where the light is first reflected, and then reflected by the surface SR1. Part of the light reflected by the surface SR1 is reflected by the surface SR2 which is the half mirror surface, and then travels toward the surface SR1. The light is now transmitted by the surface SR1 and guided to the right eye ER of the observer.

The first reflection and the third reflection by the surfaces SL1 and SR1 are realized by half mirrors having semi-transmissive reflective films formed on the surfaces SL1 and SR1 or by internal total reflection in the prisms 53 and 63. The use of the internal total reflection can increase the light use efficiency to display a bright image.

It is also possible that no reflective film is provided but internal total reflection is used in each area of the surfaces SL1 and SR1 through which effective rays pass and a reflective film is formed to reflect light in the other portions. In this case, the flexibility of optical design can be increased without significantly reducing brightness to improve optical performance and reduce the size of the optical system as compared with the case where all the rays are subjected to the internal total reflection.

The second reflection by the surfaces SL1 and SR1 is returning reflection in which the surfaces SL1 and SR1 receive the light after the first reflection by the surfaces SL1 and SR1 serving as the decentered reflective surface through the surfaces SL3 and SR3 serving as the decentered reflective surfaces to reflect the light back toward the surfaces SL3 and SR3 to result in the third reflection realized by the surfaces SL1 and SR1 in the opposite direction laterally to the traveling direction of the light in the first reflection. Thus, it is necessary to form a reflective film in each effective reflection area for the second reflection of the surfaces SL1 and SR1.

When the reflective film is formed on part of each of the surfaces SL1 and SR1 in this manner to provide both the reflective area using the reflective film and the reflective area using the internal total reflection or the semi-transmissive reflective area in the single surface, a gradation reflective film is desirably used to have a gradually increasing thickness toward the reflective area using the reflective film from the reflective area using the internal total reflection or the semi-transmissive reflective area (in a direction away from the central axis L in this case) near the boundary between the areas. This is preferable since the boundary between the reflective areas is not conspicuous.

In Embodiment 3, the surfaces SL1 and SR1 are used to produce the decentering reflection effect twice, the returning reflection effect, and the transmission effect to reduce the number of necessary optical elements. In addition, the surface SL2 and SR2 are used to produce both the transmission effect and the decentering reflection effect to further reduce the number of optical elements.

In the left eye optical system 42, the light incident on the prism 53 from the surface SL2 travels in a direction (to the left) away from the central axis L shown by the dash dotted line in FIGS. 7 to 9, and is incident on the surface SL1. The light is further reflected by the surface SL1 in a direction away from the central axis L, reflected and deflected by the surface SL3, and travels in a direction incident on the surface SL1 substantially perpendicularly. The surface SL1 reflects the light in the opposite direction back to the surface SL3. The surface SL3 reflects the light in a direction approaching the central axis L, and the surface SL1 reflects the light in a direction further approaching the central axis L.

In this manner, a go and return optical path is formed such that the light travels from the surfaces SL1, SL3, SL1, SL3, and then to SL1. This reduces the size of the optical system by the overlapping optical paths in the optical system.

In Embodiment 3, by adding the surface SL2 which allows the light to enter the prism 53 and serves as the final reflective concave surface in the prism 53, a go and return optical path is formed such that the light travels from the surfaces SL2, SL1, SL3, SL1, SL3, SL1, and then to SL2 to provide the overlapping optical paths. This increases the overlap of the light to extremely reduce the size of the optical system for the optical path length.

In Embodiment 3, the light reflected by the surface SL1 in the direction approaching the central axis L is guided by the surface SL2 toward the left eye EL of the observer. In other words, when the rays traveling from the image forming device 41 toward the pupil are inversely traced from the pupil, the inversely traced rays are bent by the surface SL2 in an outward direction away from the central axis L (that is, the central plane), and further bent by the surface SL1 in the outward direction away from the central axis L.

This can reduce the size of the area which is optically used between the rays toward the left eye EL and the central axis L for the field angle, and advantage can be taken of that reduction to increase the field angle, thereby making it possible to employ an optical arrangement suitable for a larger field angle.

Embodiment 3 employs the structure in which the plurality of decentered reflective surfaces SL1, SL2, and SL3 are used to fold the optical path to achieve a reduced thickness. The structure can be combined with the go and return optical path provided as described above to ensure a large optical path length in the small and thin optical system. It is thus possible to employ the structure of one-time image formation in which an intermediate image of the original image formed on the original image forming surface SI of the image forming device 41 is once formed in the left eye optical system 42 and the intermediate image is enlarged and presented as a virtual image while the optical system is formed in a compact size.

In Embodiment 3, for example as shown in FIG. 9, the intermediate image (a real image) is formed on an intermediate image forming position IM after the reflection by the surface SL3 and before the reflection by the surface SL1 (the returning reflection). The surfaces SL5, SL4, SL2, SL1, SL3, and SL1 are used as a relay optical system, while the surfaces SL3, SL1, SL2, and SL1 are used as an ocular optical system. This can increase the flexibility in field angle setting for the size of the original image forming surface SI of the image forming device 41 to achieve a larger field angle.

In this event, to reduce the number of the optical elements in the relay optical system and the ocular optical system, the intermediate image may be curved as appropriate to have an astigmatic difference such that aberration caused by the relay optical system and aberration caused by the ocular optical system cancel out each other. This structure can prevent an increase in the number of the optical elements while optical performance of the entire system is maintained.

In the structure of Embodiment 3, at least one of the three decentered reflective surfaces SL1, SL2, and SL3 constituting part of the left eye optical system 42 is formed as a curved surface to enlargingly present an image of the original image formed on the original image forming surface SI of the image forming device 41.

If the number of curved reflective surfaces is increased among the decentered reflective surfaces, it is possible to reduce the number of optical elements which do not contribute to image formation or aberration correction. As a result, a cost reduction and improvement in optical performance can be achieved. That is, all the three decentered reflective surfaces may be formed as curved surfaces to allow a cost reduction and improvement in optical performance.

The surface SL1 is preferably formed to satisfy the following expression:

$$\theta < 45°$$

where $\theta$ represents an angle (in the absolute value) formed between the central principal ray as the incident ray on the surface SL1 and the central principal ray as the emerging (reflected) ray therefrom in the second reflection in which the central principal ray is reflected on the surface SL1 toward the surface SL3 after the first reflection by the surface SL1 and the first reflection by the surface SL3 as shown in FIG. 7.

If the angle $\theta$ is equal to or larger than 45°, it is difficult for the surface SL1 to function as the returning reflective surface and thus to form the go and return optical path.

More desirably, the following is satisfied:

$$\theta < 30°$$

If the angle $\theta$ is equal to or larger than 30°, the surface SL3 and the surface SL1 have a large effective surface size to cause difficulty in making the entire optical system compact, although the surface SL1 can have the function as the returning reflective surface.

Thus, it is desirable that the surface SL1 in the second reflection is not decentered with respect to the central principal ray ($\theta = 0°$) or is a decentered reflective surface in the aforementioned range of the condition for $\theta$.

When the decentered reflective surface is formed as a curved surface, rotationally asymmetric aberration or so-called decentering aberration occurs which is not caused in a conventional coaxial and rotationally symmetric optical system. Thus, it is preferable that at least one of the decentered reflective surfaces is formed in a rotationally asymmetric shape to correct the decentering aberration. Since an increased number of rotationally asymmetric surfaces enhances the flexibility in correction of the decentering aberration, a plurality of surfaces are desirably formed as rotationally asymmetric surfaces.

More desirably, all the decentered reflective curved surfaces may be formed in a rotationally asymmetric shape to achieve significantly favorable optical performance.

The above description for the structure and the optical effects of the left eye optical system 42 applies to the right eye optical system 43. Thus, the head mounted display as a whole has an optical structure which involves a reduced cost, has a compact size, and appropriately achieves a larger field angle while guiding an image of the original image formed in the single image forming device 41 to the left and right eyes in the optical system.

It is desirable that the aforementioned rotationally asymmetric surfaces are plane-symmetric longitudinally (in a direction perpendicular to the sheet of the figures) with respect to a horizontal plane (the sheet) passing through the center of the original image forming surface SI of the image forming device 41 and the center between the exit pupils (in other words, the central axis L) of the left and right eye optical systems 42 and 43. Since the structure described above can provide a reference plane for manufacturing and assembly, the manufacturing and assembly are facilitated to provide the effect of a cost reduction. Particularly, when the horizontal plane is the only symmetry plane, the flexibility in optical design can be increased to achieve favorable optical performance while the reference plane for manufacturing and assembly is maintained.

Figure 14:
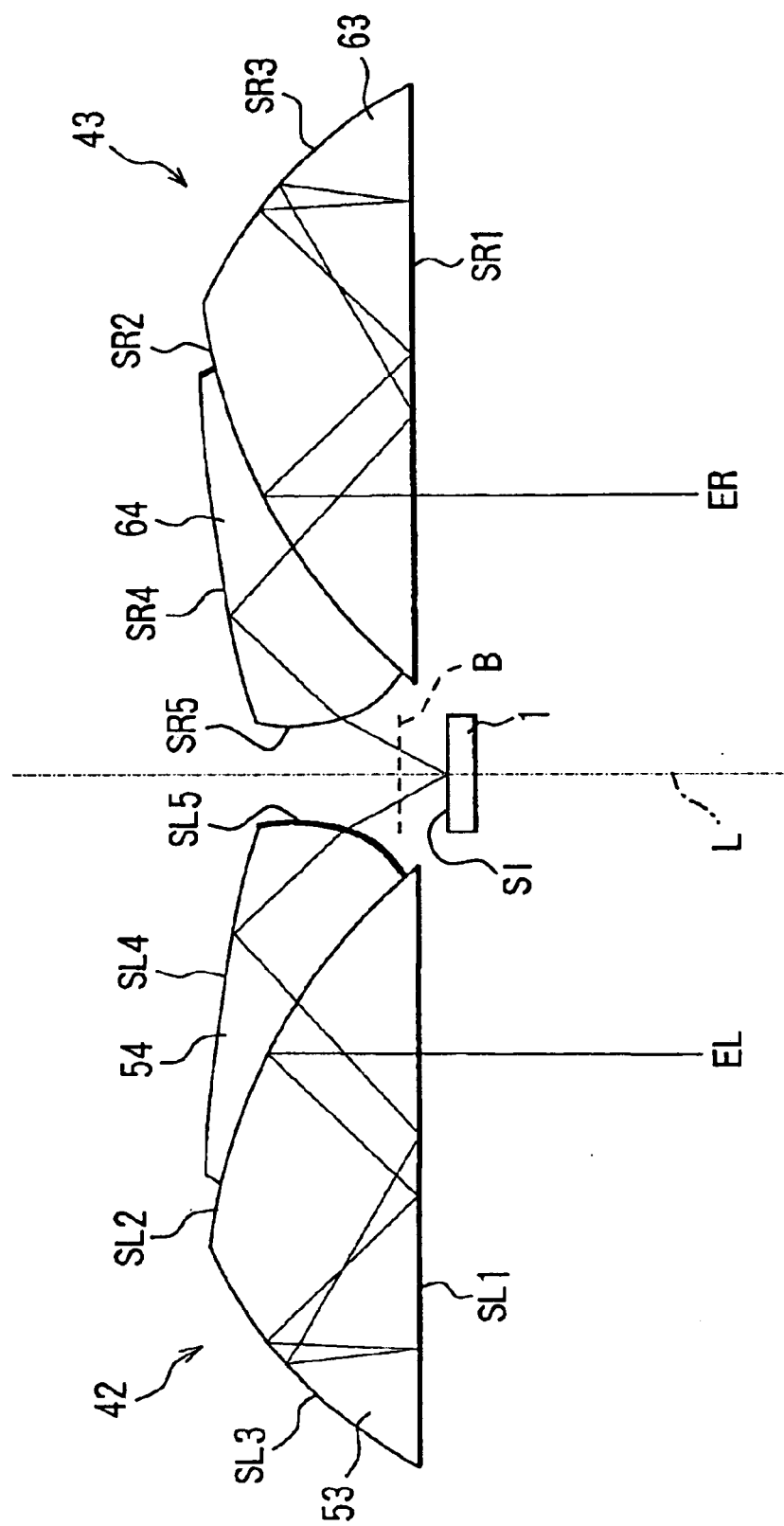
FIG. 14 is a plan view showing a variation of Embodiment 3.

When the image forming device 41 is disposed to protrude to some extent from the optical systems 42 and 43 toward the observer, the optical path may be bent at a position B shown by a dotted line in FIG. 14 off the horizontal plane (in the sheet of the figure) including the central principal ray.

Figure 15:
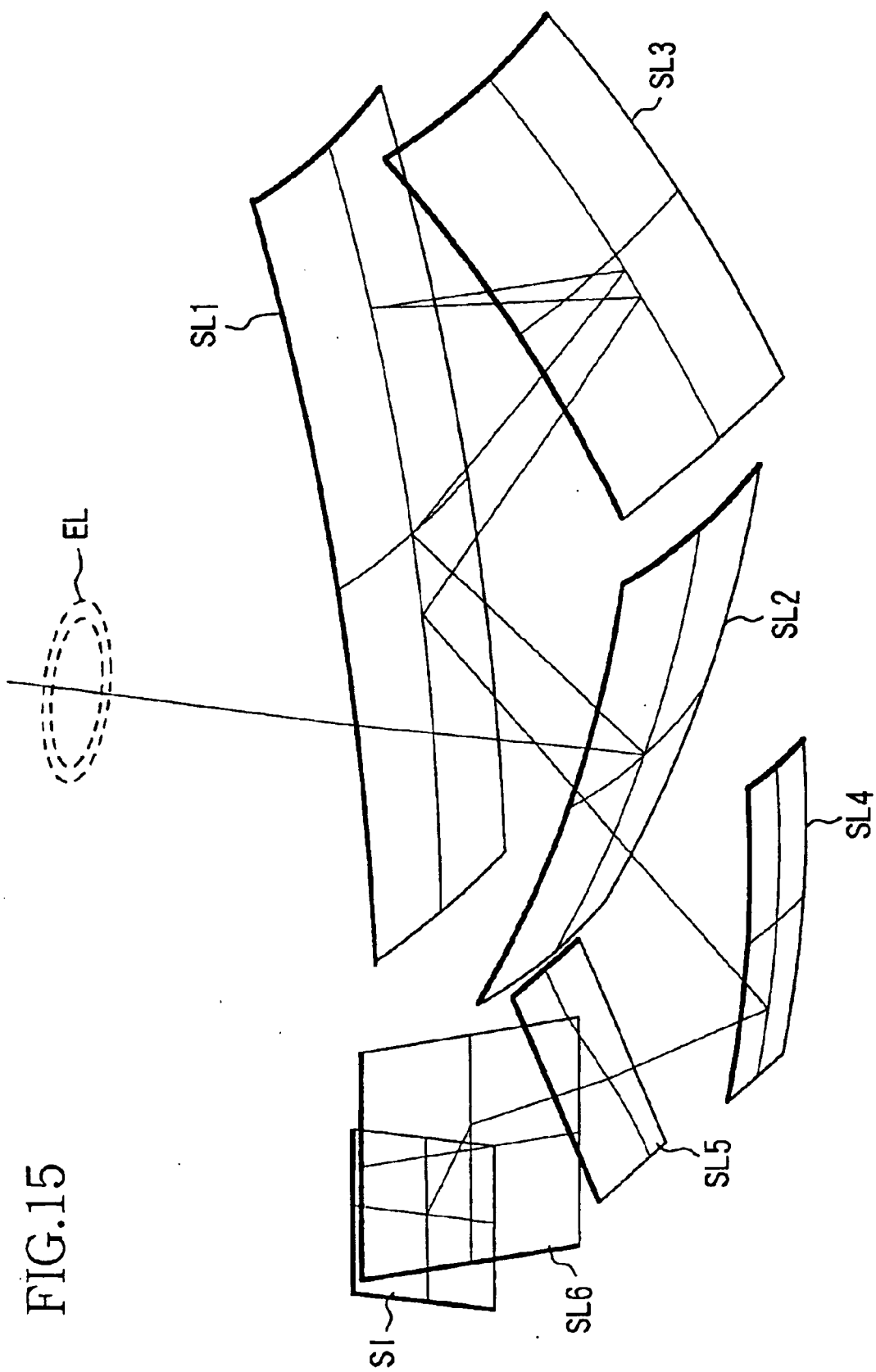
FIG. 15 is a perspective view showing a variation of Embodiment 3.
Figure 16:
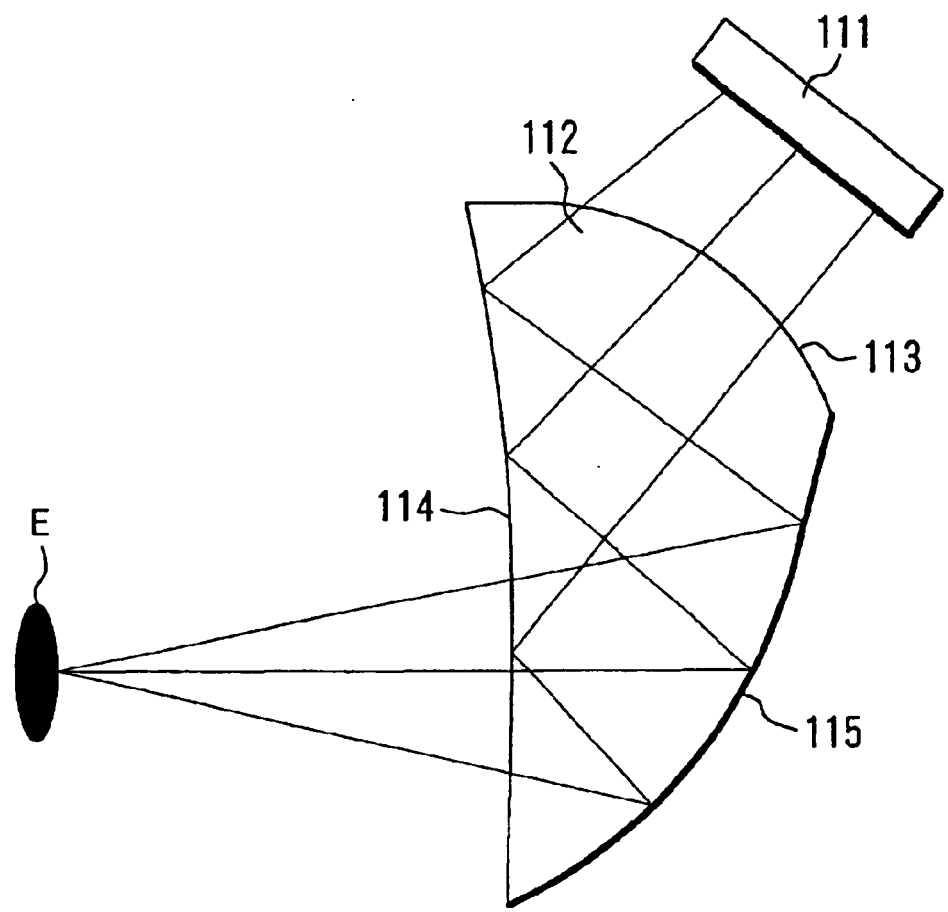
FIG. 16 shows the structure of main portions of a conventional head mounted display.
Figure 17:
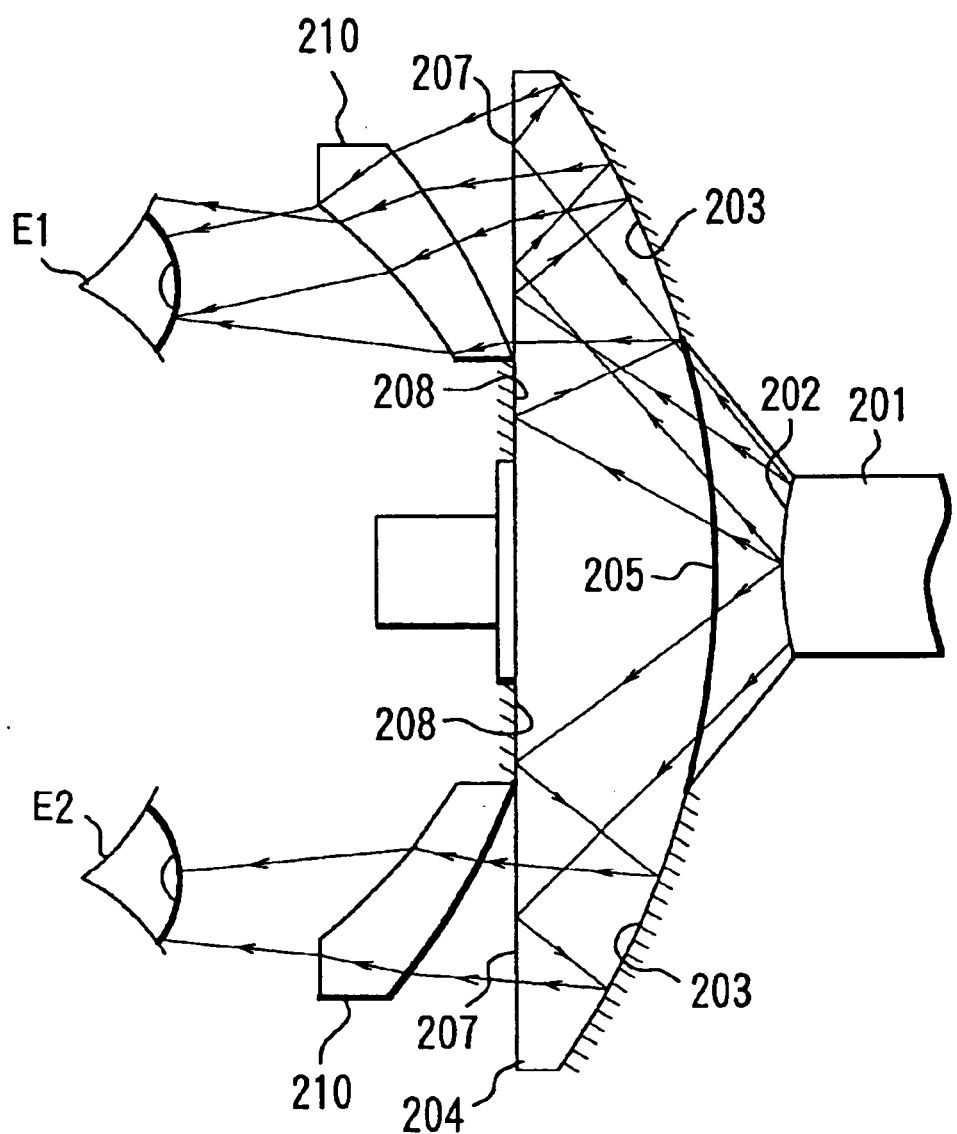
FIG. 17 shows the structure of main portions of a conventional head mounted display.
Figure 18:
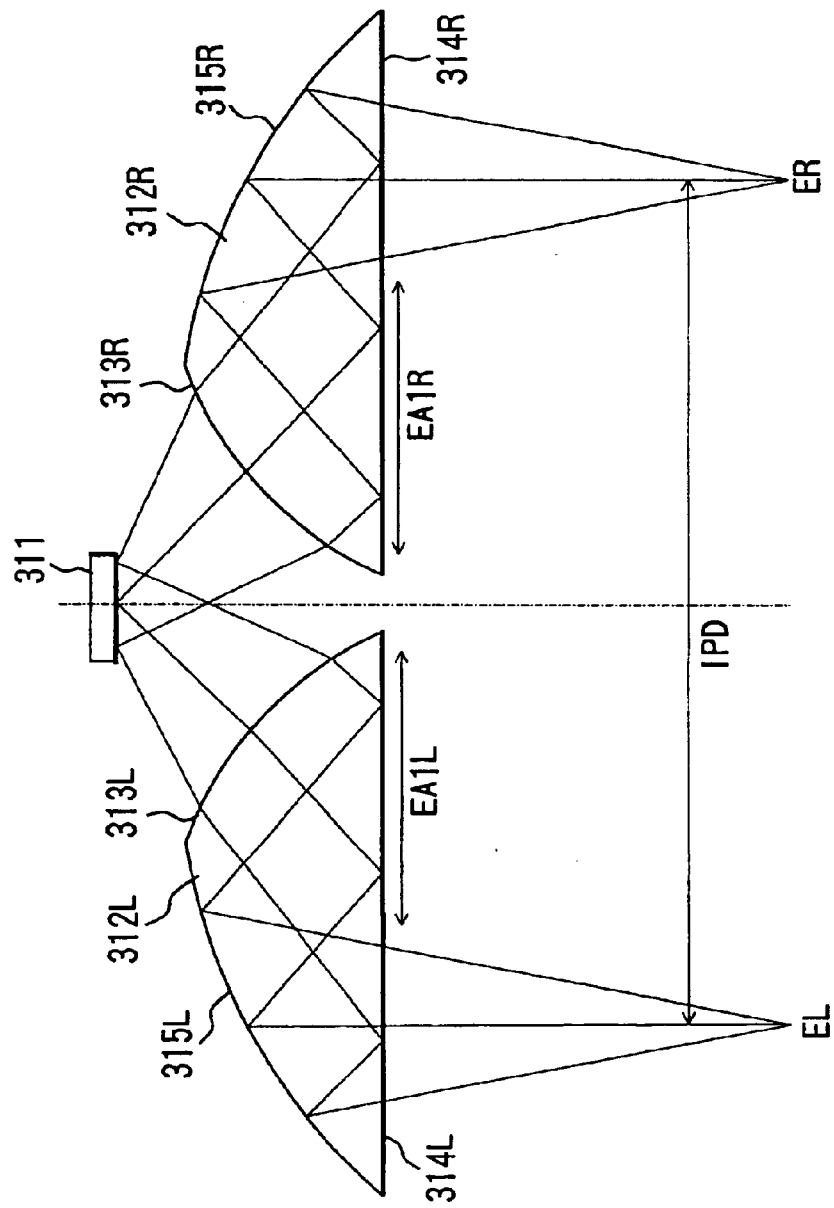
FIG. 18 shows the structure of main portions of a conventional head mounted display.

FIG. 15 is a perspective view showing the left eye optical system when the optical path is bent perpendicularly to the sheet of FIG. 14 by additionally providing a mirror SL6. The bent optical path by the mirror SL6 in this manner can easily provide space for avoiding the nose of the observer required when the head mounted display is constituted. This eliminates the need to reduce a back focal distance with enormous efforts to easily achieve high optical performance.

In each of Embodiments 1 to 3 described above, the reflective film refers to a film by which substantially no light is transmitted. A film by which part of light is transmitted is referred to as a semi-transmissive reflective film for distinction from the reflective film. However, the semi-transmissive reflective film is not limited to a film by which light is transmitted and reflected at the same ratios.

Numerical Example 1

Figure 10:
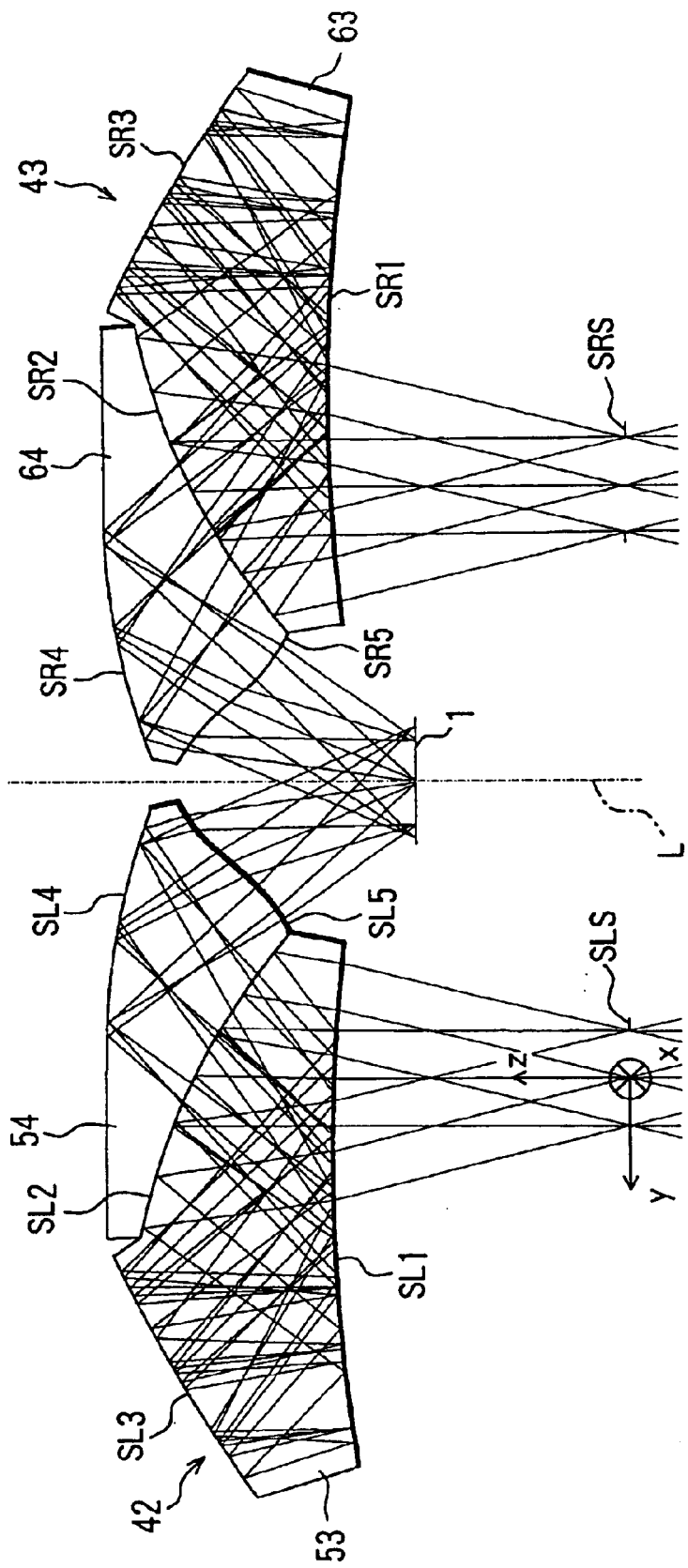
FIG. 10 shows the structure of main portions in Numerical Example 1 of the present invention.
Figure 11:
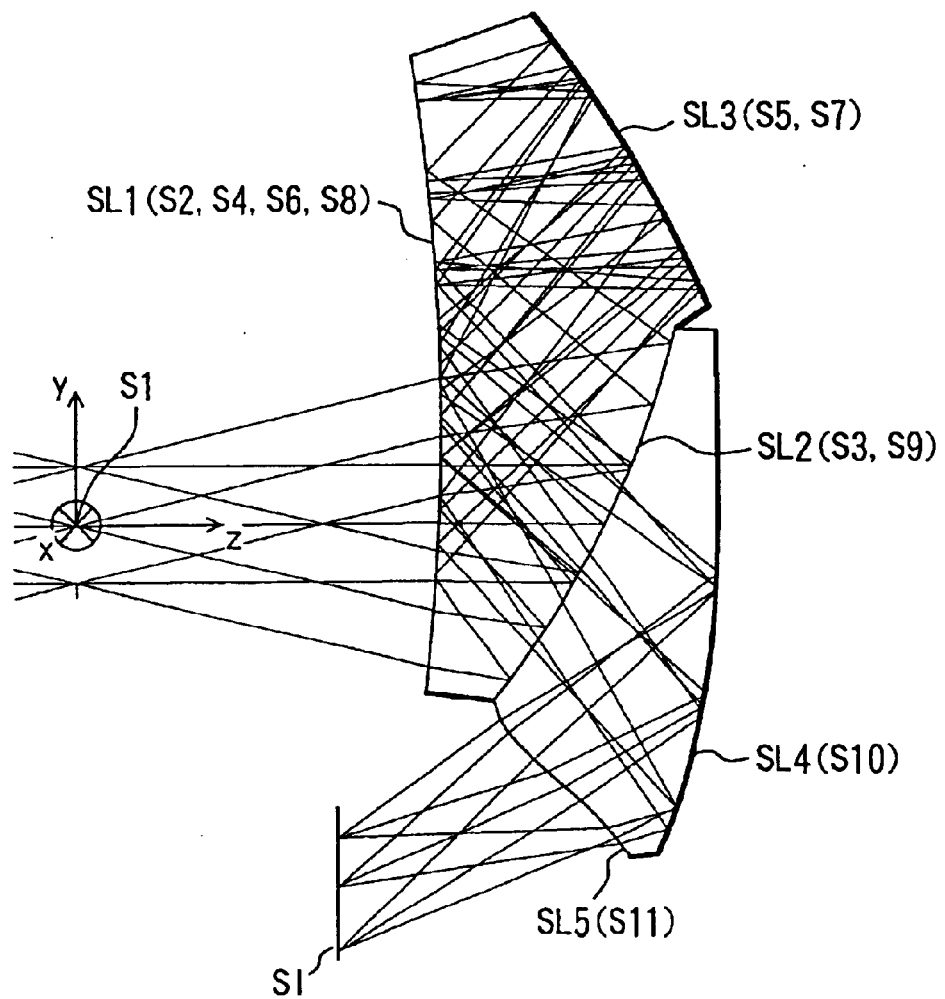
FIG. 11 shows the structure of main portions in Numerical Example 1.

FIGS. 10 and 11 are schematic diagrams for explaining Numerical Example 1 of the present invention. Numerical Example 1 is associated with Embodiment 3 described above.

In FIG. 10, SI shows the original image forming surface of the image forming device 41. SL1, SL2, SL3, SL4, and SL5 show the optical surfaces constituting the left eye optical system 42. SLS shows the exit pupil of the left eye optical system 42.

SR1, SR2, SR3, SR4, and SR5 show the optical surfaces constituting the right eye optical system 43. SRS shows the exit pupil of the right eye optical system 43.

As described above as the preferable structure in Embodiment 3, each of the surfaces in the left eye optical system 42 and the right eye optical system 43 is formed in plane symmetry which has a yz section which is the plane of the sheet of the figure as the only plane of symmetry, so that the left and right optical systems have the same structures. Thus, the following description is made for only one of the optical systems (the left eye optical system 42). This applies to Numerical Examples 2 and 3 below.

In the following description, a coordinate system described below is used. The center of the pupil SLS is defined as the origin point. A z axis is defined as the direction of the optic axis (the direction matches the central principal ray between the pupil SLS and the plane SL1). A y axis is defined as the direction perpendicular to the z axis on the sheet (a plane including the central principal ray). An x axis is defined such that the direction penetrating the sheet is positive to form a right-handed system. The surfaces arranged in the coordinate system are designated with the surface numbers in order in which the rays from the original image forming surface SL1 to the pupil SLS are inversely traced.

Thus, as shown in FIG. 11, the pupil is shown as S1. The surface SL1 in FIG. 10 is shown as an incident surface S2 of the inversely traced rays, a decentered reflective surface S4, a returning reflective surface S6, and a decentered reflective surface S8. The surface SL2 is shown as a decentered reflective surface S3 and a transmissive surface S9. The surface SL3 is shown as decentered reflective surfaces S5 and S7. The surface SL4 is shown as a reflective surface S10. The surface SL5 is shown as a transmissive surface S11. The original image forming surface is shown as SI without change.

The surface arrangement is decentered only in the yx section, and thus rotation is caused about the x axis. This is represented by A (in degrees (°)) with a counterclockwise direction defined as positive.

Optical data tables show the surface number SURF, the positions X, Y, Z of each surface, and rotational angle A of each surface. The radius of curvature is represented by R, the type of surface definition by typ, the refractive index and the Abbe number of a medium after the surface by nd and νd. In addition, e-M represents $10^{-M}$.

Air is represented by Nd=1 and νd=0, and the sign of the value of Nd is changed when the surface reflects light. For the type of surface definition, SPH represents a spherical surface expressed only by the value of the radius of curvature R, and SPS represents a rotationally asymmetric surface which is represented by the following expression (1) and has coefficients shown in lower portions of Table 1 corresponding to the number given after SPS. When not shown in Table 1, the coefficient in the term is equal to zero.

$$z = \frac{cr^2}{1 + SQRT[1-(1+k)c^2r^2]} + \sum_{i=2}^{66} c_j x^m y^n \quad (1)$$

$$j = [(m+n)^2 + m + 3n]/2 + 1$$

where $c = 1/R, \; r = \sqrt{(x^2+y^2)}$

The above description applies to Numerical Examples 2 to 3.

Table 1 shows data in Numerical Example 1. The data can be used to realize a optical system with a horizontal (y direction) field angle of 30°, a vertical field angle of approximately 23°, and a pupil diameter of 10 mm for an original image forming surface of approximately 0.5 inches diagonally (10.2 mm×7.6 mm) when the length is represented in millimeters.

In terms of optical design, rays (inversely traced rays) coming from a point at infinity and passing through the pupil S1 are incident on the first prism from the surface S2, reflected by the surfaces S3, S4, S5, S6, S7, and S8, incident on the second prism from the surface S9, reflected by the surface S10, emerge from the surface S11, and then formed into an image on the original image forming surface SI.

Thus, rays from the original image forming surface SI are guided to the pupil S1 in the reverse path to the aforementioned one, and an observer having his or her pupil at the position of the pupil S1 can recognize an enlarged virtual image of a horizontal field angle of 30° at infinity.

TABLE 1

| SURF | X | Y | Z | A | R | typ | Nd | vd |
|---|---|---|---|---|---|---|---|---|
| 1 | 0.000 | 0.000 | 0.000 | 0.000 | ∞ | SPH | 1.0000 | 0.0 |
| 2 | 0.000 | −7.285 | 26.153 | 1.115 | −305.2224 | SPS1 | 1.5709 | 33.8 |
| 3 | 0.000 | −6.526 | 36.298 | −25.878 | −96.8602 | SPS2 | −1.5709 | 33.8 |
| 4 | 0.000 | −7.285 | 26.153 | 1.115 | −305.2224 | SPS1 | 1.5709 | 33.8 |
| 5 | 0.000 | 14.164 | 47.382 | 24.189 | −99.7291 | SPS3 | −1.5709 | 33.8 |
| 6 | 0.000 | −7.285 | 26.153 | 1.115 | −305.2224 | SPS1 | 1.5709 | 33.8 |
| 7 | 0.000 | 14.164 | 47.382 | 24.189 | −99.7291 | SPS3 | −1.5709 | 33.8 |
| 8 | 0.000 | −7.285 | 26.153 | 1.115 | −305.2224 | SPS1 | 1.5709 | 33.8 |
| 9 | 0.000 | −6.526 | 36.298 | −25.878 | −96.8602 | SPS2 | 1.5709 | 33.8 |
| 10 | 0.000 | −5.956 | 48.165 | 0.485 | −90.7507 | SPS4 | −1.5709 | 33.8 |
| 11 | 0.000 | −16.855 | 31.486 | 28.440 | 8.4304 | SPS5 | −1.0000 | 0.0 |
| I | 0.000 | −31.500 | 20.819 | 0.000 | ∞ | SPH | −1.0000 | 0.0 |

SPS1 k: $1.8613e+01$  c4: $-6.6076e-03$  c6: $4.0901e-04$  c8: $-1.5400e-04$
c10: $-6.1349e-06$  c11: $2.4803e-06$  c13: $-5.9119e-06$  c15: $-1.7999e-07$

SPS2 k: $-1.8861e+00$  c4: $-1.3956e-03$  c6: $-1.4504e-03$  c8: $-1.2584e-04$
c10: $-1.4678e-05$  c11: $4.9186e-07$  c13: $1.9753e-06$  c15: $9.2345e-07$

SPS3 k: $2.8152e+00$  c4: $-5.0991e-03$  c6: $1.2520e-03$  c8: $-2.5645e-05$
c10: $2.0148e-05$  c11: $9.0811e-07$  c13: $-5.5939e-06$  c15: $-2.8068e-07$

SPS4 k: $-3.2053e+01$  c4: $-5.6389e-03$  c6: $1.5074e-04$  c8: $1.5579e-04$
c10: $1.0478e-04$  c11: $1.6326e-05$  c13: $3.3390e-06$  c15: $-2.8989e-06$

SPS5 k: $-8.5159e-01$  c4: $-1.2880e-02$  c6: $-7.9671e-03$  c8: $3.5790e-03$
c10: $2.8434e-03$  c11: $2.9525e-05$  c13: $5.4985e-05$  c15: $-3.2370e-05$

Numerical Example 2

Figure 12:
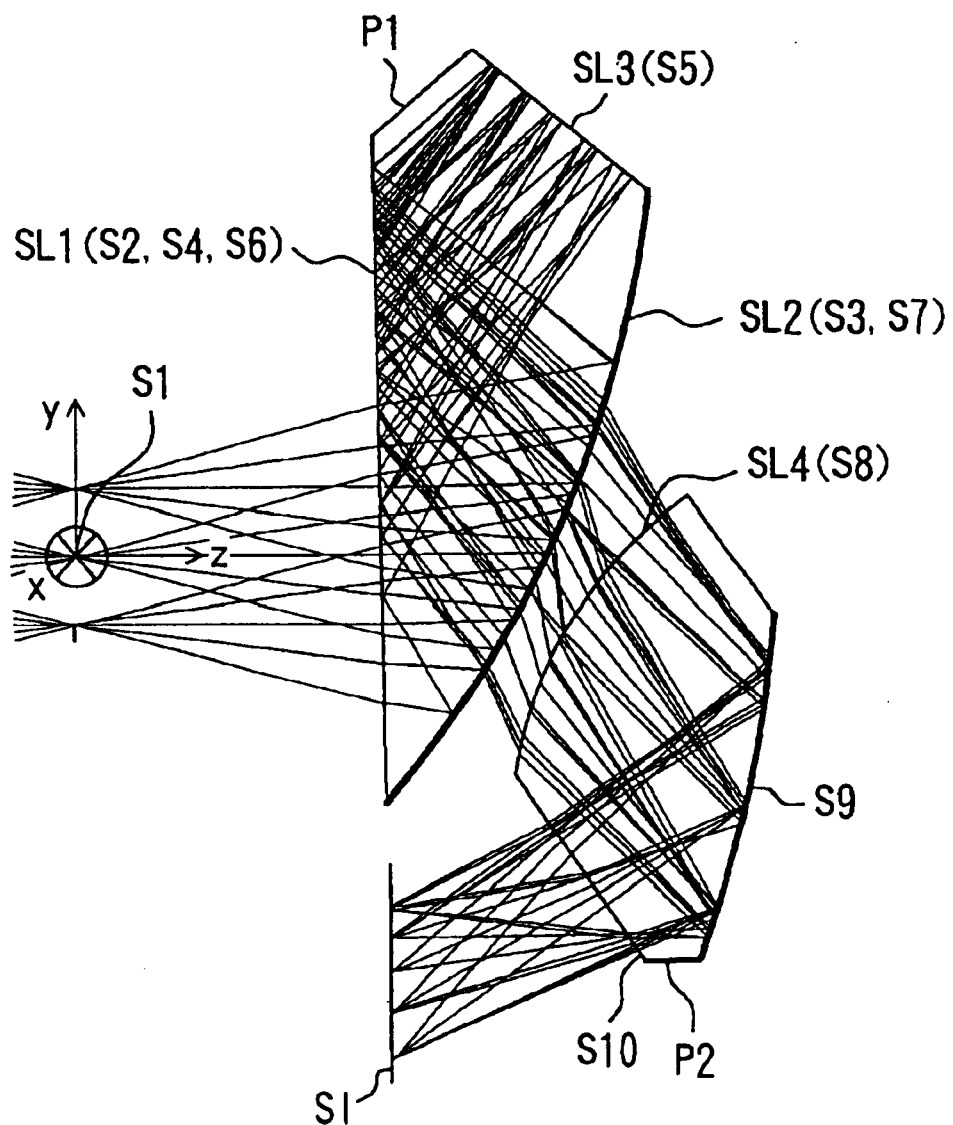
FIG. 12 shows the structure of main portions in Numerical Example 2 of the present invention.

FIG. 12 shows the structure of main portions of an optical system in Numerical Example 2 of the present invention. Numerical Example 2 represents a variation of Embodiment 2 described above. A first prism P1 has the same form as the prisms 21 and 31 described in Embodiment 2, and a second prism P2 is used instead of the lenses 22 and 32. Table 2 shows optical data of Numerical Example 2.

Symbols and the like in Table 2 are basically identical to those in Table 1. However, ZRN* given as typ means a rotationally asymmetrical surface which is represented by the following expression (2) and has coefficients shown in lower portions of Table 2. When not shown in Table 2, the coefficient in the term is equal to zero.

$$z=(1/R)(x^2+y^2)/(1+(1-(1+k)(1/R)^2(x^2+y^2))^{(1/2)})+c2+c4y+c5(x^2-y^2)$$
$$+c6(-1+2x^2+2y^2)+c10(-2y+3x^2y+3y^3)+c11(3x^2y-y^3)$$
$$+c12(x^4-6x^2y^2+y^4)+c13(-3x^2+4x^4+3y^2-4y^4)$$
$$+c14(1-6x^2+6x^4-6y^2+12x^2y^2+6y^4)$$
$$+c20(3y-12x^2y+10x^4y-12y^3+20x^2y^3+10y^5)$$
$$+c21(-12x^2y+15x^4y+4y^3+10x^2y^3-5y^5)$$
$$+c22(5x^4y-10x^2y^3+y^5)+c23(x^6-15x^4y^2+15x^2y^4-y^6)$$
$$+c24(-5x^4+6x^6+30x^2y^2-30x^4y^2-5y^4+30x^2y^4+6y^6)$$
$$+c25(6x^2-20x^4+15x^6-6y^2+15x^4y^2+20y^4-15x^2y^4-15y^6)$$
$$+c26(-1+12x^2-30x^4+20x^6+12y^2-60x^2y^2+60x^4y^2-30y^4+60x^2y^4+20y^6)+ \ldots \quad (2)$$

The data of Numerical Example 2 can be used to realize a optical system with a horizontal (y direction) field angle of 30°, a vertical field angle of approximately 23°, and a pupil diameter of 10 mm for an original image forming surface of approximately 0.5 inches diagonally (10.2 mm×7.6 mm) when the length is represented in millimeters.

In terms of optical design, rays(inversely traced rays) coming from a point at infinity and passing through the pupil S1 are incident on the first prism P1 from the surface S2, reflected by the surfaces S3, S4, S5, and S6, and emerge from the surface S7. The rays are incident on the second prism from the surface S8, reflected by the surface S9, emerge from the surface S10, and then formed into an image on the original image forming surface SI. Thus, rays from the original image forming surface SI are guided to the pupil S1 in the reverse path to the aforementioned one, and an observer having his or her pupil at the position of the pupil S1 can recognize an enlarged virtual image of a horizontal field angle of 30° at infinity.

TABLE 2

| SURF | X | Y | Z | A | R | typ | N | vd |
|---|---|---|---|---|---|---|---|---|
| 1 | 0.000 | 0.000 | 0.000 | 0.000 | ∞ | SPH | 1.0000 | 0.0 |
| 2 | 0.000 | 0.158 | 22.135 | 0.935 | −969.1174 | ZRN1 | 1.5709 | 33.8 |
| 3 | 0.000 | −0.164 | 33.984 | −24.920 | −79.9320 | ZRN2 | −1.5709 | 33.8 |
| 4 | 0.000 | 0.158 | 22.135 | 0.935 | −969.1174 | ZRN1 | 1.5709 | 33.8 |
| 5 | 0.000 | 29.681 | 37.582 | 51.267 | 5285.1651 | ZRN3 | −1.5709 | 33.8 |
| 6 | 0.000 | 0.158 | 22.135 | 0.935 | −969.1174 | ZRN1 | 1.5709 | 33.8 |
| 7 | 0.000 | −0.164 | 33.984 | −24.920 | −79.9320 | ZRN2 | 1.0000 | 0.0 |
| 8 | 0.000 | −1.539 | 38.661 | −40.635 | 41.9482 | ZRN4 | 1.5709 | 33.8 |
| 9 | 0.000 | −9.331 | 49.816 | −6.412 | −92.7568 | ZRN5 | −1.5709 | 33.8 |
| 10 | 0.000 | −20.353 | 34.311 | 35.754 | 94.4157 | ZRN6 | −1.0000 | 0.0 |
| I | 0.000 | −31.500 | 22.640 | 0.000 | ∞ | SPH | −1.0000 | 0.0 |

ZRN1 k: −5.7790e + 02   c5: −6.3390e−   c6: 3.0603e − 05   c10: 7.6267e − 07
c11: −3.2089e − 06   c12: 7.0919e−   c13: −5.3606e − 09   c14: 6.2601e − 09

ZRN2 k: −1.2151e − 01   c5: −1.8673e−   c6: −6.9358e − 05   c10: 2.2529e − 06
c11: −1.0524e − 05   c12: −1.8408e−   c13: −1.4494e − 07   c14: −2.0724e − 09

ZRN3 k: 2.8728e − 08   c5: 2.2643e−   c6: 4.7085e − 05   c10: 1.0668e − 05
c11: 6.2695e − 05   c12: 3.5662e−   c13: 3.7011e − 07   c14: 6.2614e − 07

ZRN4 k: −9.1681e + 00   c5: 4.9406e−   c6: 3.3844e − 03   c10: −1.4247e − 04
c11: 8.8604e − 05   c12: −1.5353e−   c13: −1.4664e − 06   c14: −2.4981e − 06

ZRN5 k: 6.7671e − 01   c5: −4.0700e−   c6: −2.9929e − 04   c10: 4.1222e − 06
c11: 8.3064e − 06   c12: 1.3159e−   c13: 7.5899e − 09   c14: −4.2980e−

ZRN6 k: 4.2956e + 01   c5: 6.3112e−   c6: 3.5215e − 03   c10: 1.3921e − 04
c11: −1.0260e − 04   c12: 3.0216e−   c13: −1.1530e − 06   c14: −6.3036e − 06

Numerical Example 3

Figure 13:
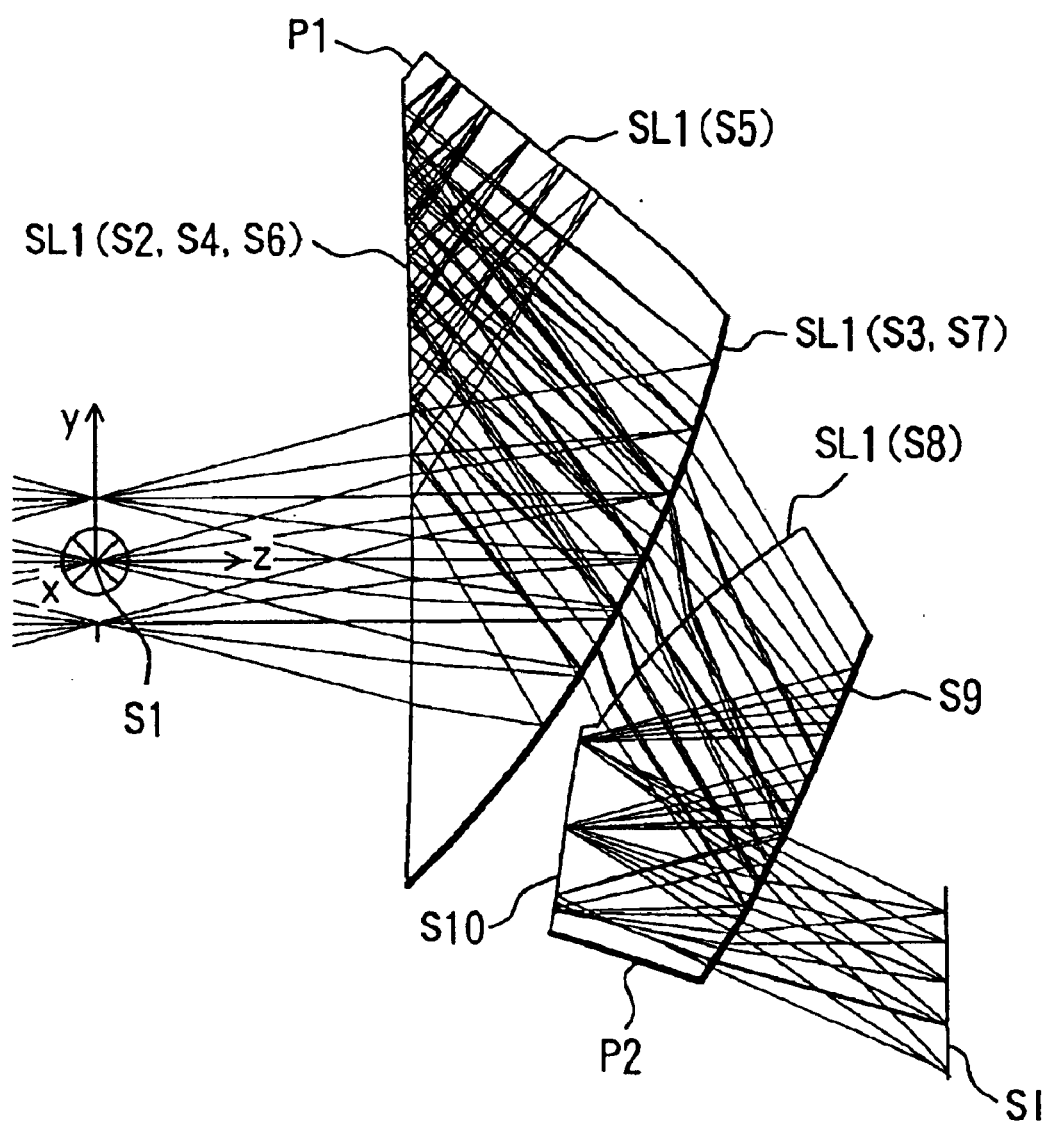
FIG. 13 shows the structure of main portions in Numerical Example 3 of the present invention.

FIG. 13 shows the structure of main portions of an optical system in Numerical Example 3 of the present invention. Numerical Example 3 represents a variation of Embodiment 2 described above. A first prism P1 has the same form as the prisms 21 and 31 described in Embodiment 2, and a second prism P2 is used instead of the lenses 22 and 32.

Numerical Example 3 differs from Numerical Example 2 in that the number of reflections by the second prism P2 is increased. Table 3 shows optical data of Numerical Example 3.

Symbols and the like in Table 3 are basically identical to those in Table 1. However, ZRN* given as typ means a rotationally asymmetrical surface which is represented by the aforementioned expression (2) and has coefficients shown in lower portions of Table 3. When not shown in Table 3, the coefficient in the term is equal to zero.

The data of Numerical Example 3 can be used to realize a optical system with a horizontal (y direction) field angle of 30°, a vertical field angle of approximately 23°, and a pupil diameter of 10 mm for an original image forming surface of approximately 0.5 inches diagonally (10.2 mm×7.6 mm) when the length is represented in millimeters.

In terms of optical design, rays(inversely traced rays) coming from a point at infinity and passing through the pupil S1 are incident on the first prism P1 from the surface S2, reflected by the surfaces S3, S4, S5, and S6, and emerge from the surface S7. The rays are incident on the second prism from the surface S8, reflected by the surfaces S9 and S10, emerge from the surface S11, and then formed into an image on the display surface SI.

Thus, rays from the display surface SI are guided to the pupil SI in the reverse path to the aforementioned one, and an observer having his or her pupil at the position of the pupil S1 can recognize an enlarged virtual image of a horizontal field angle of 30° at infinity.

TABLE 3

| SURF | X | Y | Z | A | R | typ | Nd | vd |
|---|---|---|---|---|---|---|---|---|
| 1 | 0.000 | 0.000 | 0.000 | 0.000 | ∞ | SPH | 1.0000 | 0.0 |
| 2 | 0.000 | −0.444 | 22.104 | 0.077 | −875.0947 | ZRN1 | 1.5709 | 33.8 |
| 3 | 0.000 | −1.320 | 37.620 | — | −78.0960 | ZRN2 | — | 33.8 |
| 4 | 0.000 | −0.444 | 22.104 | 0.077 | −875.0947 | ZRN1 | 1.5709 | 33.8 |
| 5 | 0.000 | 26.725 | 34.349 | 50.908 | 1452.5933 | ZRN3 | — | 33.8 |
| 6 | 0.000 | −0.444 | 22.104 | 0.077 | −875.0947 | ZRN1 | 1.5709 | 33.8 |

TABLE 3-continued

| 7 | 0.000 | −1.320 | 37.620 | — | −78.0960 | ZRN2 | 1.0000 | 0.0 |
| 8 | 0.000 | −3.386 | 42.254 | — | 40.4687 | ZRN4 | 1.5709 | 33.8 |
| 9 | 0.000 | — | 51.441 | — | −234.2743 | ZRN5 | — | 33.8 |
| 10 | 0.000 | — | 32.621 | −8.716 | 93.9123 | ZRN6 | 1.5709 | 33.8 |
| 11 | 0.000 | — | 51.441 | — | −234.2743 | ZRN5 | 1.0000 | 0.0 |
| I | 0.000 | — | 59.749 | 0.000 | ∞ | SPH | 1.0000 | 0.0 |

ZRN1 k: 5.6705e + 02   c5: −4.0120e − 05   c6: 1.5454e − 05   c10: −2.7041e − 08
c11: −7.6781e − 06   c12: 2.3706e − 07   c13: −3.0584e − 09   c14: −6.4053e − 09

ZRN2 k: 7.8049e − 01   c5: −6.9760e − 04   c6: −1.2034e − 04   c10: 3.2462e − 06
c11: −4.7675e − 06   c12: 7.2306e − 09   c13: −5.9395e − 08   c14: −2.4312e − 08

ZRN3 k: −1.6665e − 05   c5: 1.5589e − 03   c6: 1.7149e − 04   c10: 4.9476e − 05
c11: −8.8798e − 05   c12: 6.7369e − 07   c13: 3.0032e − 06   c14: 3.2767e − 07

ZRN4 k: −4.3323e + 00   c5: 7.2856e − 04   c6: 5.5245e − 04   c10: 1.6248e − 05
e11: 8.7530e − 06   c12: 1.8919e − 06   c13: −3.0799e − 07   c14: −1.4376e − 06

ZRN5 k: 2.1189e + 01   c5: 7.3049e − 06   c6: −1.1164e − 04   c10: 3.0150e − 06
e11: 3.0374e − 06   c12: 7.8107e − 08   c13: 7.4630e − 08   c14: −2.8119e − 08

ZRN6 k: −5.6498e + 00   c5: 2.6091e − 04   c6: 1.2751e − 04   c10: 5.2129e − 06
c11: −1.3827e − 06   c12: −9.0770e − 08   c13: 1.9531e − 07   c14: −9.4946e − 08

As described above, according to Embodiments 1 to 3, a larger field angle can be provided while the distance between the exit pupils of the left and right optical systems is maintained approximately at the distance between eyes of a usual observer.

The so-called go and return optical paths formed in the left and right optical systems can reduce the size of the optical systems to provide the compact image display apparatus.

In each of Embodiments 1 to 3, the left eye optical system and the right eye optical system can be formed in mirror symmetry laterally with respect to the central plane which passes through the center of the image display device and in plane symmetry longitudinally with respect to the horizontal plane to use the common optical elements in the left and right optical system to reduce the cost.

The total number of the optical elements can be reduced by forming at least one of the plurality of reflective surfaces including the first and second surfaces as a decentered reflective surface. In addition, various types of aberration can be favorably corrected to improve optical performance by forming at least one reflective surface as a rotationally asymmetric surface.

Furthermore, in the left eye optical system and the right eye optical system, the intermediate real image of the original image is formed to allow display of an image at a large field angle even when the original image (that is, the image display device) has a small size.

While preferred embodiments have been described, it is to be understood that modification and variation of the present invention may be made without departing from the scope of the following claims.

What is claimed is:

1. An image display apparatus comprising:

a single image forming device which forms an original image; and a first optical system and a second optical system which are disposed on both sides of a central plane which includes a central axis of the image forming device, the first optical system guiding light from the image forming device to a first eye of an observer placed near a pupil of the first optical system, and the second optical system guiding light from the image forming device to a second eye of the observer placed near a pupil of the second optical system, wherein, when light traveling from the image forming device to each of the pupils is inversely traced from the pupil, each of the first and second optical systems includes:

a first surface which reflects the inversely traced light from the pupil in a direction away from the central plane; and a second surface which reflects the inversely traced light from the first surface in a direction away from the central plane, wherein each of the first and second optical systems is arranged in plane symmetry with respect to a plane perpendicular to the central plane.

2. An image display apparatus comprising:

a single image forming device which forms an original image; and a first optical system and a second optical system which are disposed on both sides of a central plane which includes a central axis of the image forming device, the first optical system guiding light from the image forming device to a first eye of an observer placed near a pupil of the first optical system, and the second optical system guiding light from the image forming device to a second eye of the observer placed near a pupil of the second optical system, wherein, when light traveling from the image forming device to each of the pupils is inversely traced from the pupil, each of the first and second optical systems includes:

a first surface which reflects the inversely traced light from the pupil in a direction away from the central plane; and a second surface which reflects the inversely traced light from the first surface in a direction away from the central plane, wherein each of the first and second optical systems includes a plurality of reflective surfaces including the first and second surfaces, and at least one of the plurality of reflective surfaces is a decentered curved surface.

3. An image display apparatus comprising:

a single image forming device which forms an original image; and a first optical system and a second optical system which are disposed on both sides of a central plane which includes a central axis of the image forming device, the first optical system guiding light from the image forming device to a first eye of an observer placed near a pupil of the first optical system, and the second optical system guiding light from the image forming device to a second eye of the observer placed near a pupil of the second optical system, wherein, when light traveling from the image forming device to each of the pupils is inversely traced from the pupil, each of the first and second optical systems includes:

a first surface which reflects the inversely traced light from the pupil in a direction away from the central plane; and a second surface which reflects the inversely traced light from the first surface in a direction away from the central plane, wherein each of the first and second optical systems includes a plurality of reflective surfaces including the first and second surfaces, and at least one of the plurality of reflective surfaces is a rotationally asymmetric surface.

4. An image display apparatus comprising:

a single image forming device which forms an original image; and a first optical system and a second optical system which are disposed on both sides of a central plane which includes a central axis of the image forming device, the first optical system guiding light from the image forming device to a first eye of an observer placed near a pupil of the first optical system, and the second optical system guiding light from the image forming device to a second eye of the observer placed near a pupil of the second optical system, wherein, when light traveling from the image forming device to each of the pupils is inversely traced from the pupil, each of the first and second optical systems includes:

a first surface which reflects the inversely traced light from the pupil in a direction away from the central plane; and a second surface which reflects the inversely traced light from the first surface in a direction away from the central plane, wherein intermediate image is formed from light from the image forming device within each of the first and second optical systems.

5. An image display apparatus comprising:

a single image forming device which forms an original image; and a first optical system and a second optical system which are disposed on both sides of a central plane which includes a central axis of the image forming device, the first optical system guiding light from the image forming device to a first eye of an observer placed near a pupil of the first optical system, and the second optical system guiding light from the image forming device to a second eye of the observer placed near a pupil of the second optical system, wherein, when light traveling from the image forming device to each of the pupils is inversely traced from the pupil, each of the first and second optical systems includes:

a first surface which reflects the inversely traced light from the pupil in a direction away from the central plane; and a second surface which reflects the inversely traced light from the first surface in a direction away from the central plane, wherein each of the first and second optical systems includes a third surface which reflects the inversely traced light reflected by the second surface back to the second surface.

* * * * *

UNITED STATES PATENT AND TRADEMARK OFFICE
CERTIFICATE OF CORRECTION

PATENT NO. : 7,199,935 B2  
APPLICATION NO. : 10/728425  
DATED : April 3, 2007  
INVENTOR(S) : Inoguchi et al.

Page 1 of 1

It is certified that error appears in the above-identified patent and that said Letters Patent is hereby corrected as shown below:

Column 8, line 51: please delete "EL and EL" and insert therefor -- EL and ER --;

Column 13, line 29: please delete "right eye EL" and insert therefor -- right eye ER --;

Column 18, line 28: please delete "by nd and vd" and insert therefor -- by Nd and vd --;

Column 20, line 53: please delete "rays(inversely" and insert therefor -- rays (inversely --;

Column 22, line 43: please delete "rays(inversely" and insert therefor -- rays (inversely --;

Column 21, TABLE 2, in the top row (heading): please delete "N" and insert therefor -- Nd --.

Signed and Sealed this

Twenty-fourth Day of March, 2009

JOHN DOLL  
*Acting Director of the United States Patent and Trademark Office*